United States Patent
Ryu et al.

(10) Patent No.: US 10,499,369 B2
(45) Date of Patent: Dec. 3, 2019

(54) METHODS AND APPARATUS FOR SUPPORTING MULTIPLE SERVICES IN WIRELESS COMMUNICATION SYSTEM

(71) Applicant: Samsung Electronics Co., Ltd., Gyeonggi-do (KR)

(72) Inventors: Hyunseok Ryu, Yongin-si (KR); Hyunil Yoo, Suwon-si (KR); Peng Xue, Suwon-si (KR); Namjeong Lee, Suwon-si (KR); Cheol Jeong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/721,620

(22) Filed: Sep. 29, 2017

(65) Prior Publication Data
US 2018/0092064 A1    Mar. 29, 2018

(30) Foreign Application Priority Data

Sep. 29, 2016  (KR) .................. 10-2016-0125955
Apr. 7, 2017   (KR) .................. 10-2017-0045199

(51) Int. Cl.
*H04W 72/00* (2009.01)
*H04W 56/00* (2009.01)
(Continued)

(52) U.S. Cl.
CPC ......... *H04W 72/005* (2013.01); *H04W 48/10* (2013.01); *H04W 56/001* (2013.01); *H04L 67/12* (2013.01); *H04W 72/0453* (2013.01)

(58) Field of Classification Search
CPC . H04W 72/005; H04W 48/12; H04W 56/001; H04W 48/10; H04W 74/0833;
(Continued)

(56) References Cited

U.S. PATENT DOCUMENTS

2009/0197610 A1*  8/2009  Chun ................ H04W 72/1284
                                                 455/450
2013/0083749 A1   4/2013  Xu et al.
(Continued)

FOREIGN PATENT DOCUMENTS

WO    2016004634 A1    1/2016

OTHER PUBLICATIONS

ISA/KR, International Search Report, International Application No. PCT/KR2017/010425, dated Feb. 1, 2018, 3 pages.
(Continued)

*Primary Examiner* — Kwang B Yao
*Assistant Examiner* — Syed M Bokhari

(57) ABSTRACT

The present disclosure relates to a communication technique of fusing a 5G communication system for supporting higher data transmission rate beyond a 4G system with IoT technology and a system thereof. The present disclosure may be applied to intelligent services (e.g., smart home, smart building, smart city, smart car or connected car, health care, digital education, retail business, security and safety related service, or the like) based on the 5G communication technology and the IoT related technology. The present disclosure discloses a method and an apparatus for transmitting/receiving a random access channel (RACH) according to beam reciprocity (beam correspondence) with a method and an apparatus for supporting various services.

16 Claims, 36 Drawing Sheets

(51) Int. Cl.
*H04W 48/10* (2009.01)
*H04L 29/08* (2006.01)
*H04W 72/04* (2009.01)

(58) Field of Classification Search
CPC .. H04W 74/008; H04W 72/0453; H04L 5/00; H04L 67/12
USPC .................................................. 370/312, 329
See application file for complete search history.

(56) References Cited

U.S. PATENT DOCUMENTS

| | | | |
|---|---|---|---|
| 2013/0176952 A1* | 7/2013 | Shin | ........................ H04L 5/001 370/329 |
| 2015/0043456 A1* | 2/2015 | Rikkinen | ............. H04B 1/7143 370/329 |
| 2015/0180622 A1 | 6/2015 | Yoo et al. | |
| 2016/0219498 A1 | 7/2016 | Abraham et al. | |
| 2016/0269135 A1 | 9/2016 | Jiang et al. | |
| 2017/0311276 A1* | 10/2017 | Tsai | ........................ H04B 7/0617 |
| 2017/0359791 A1* | 12/2017 | Onggosanusi | ...... H04L 27/2613 |
| 2018/0035421 A1* | 2/2018 | Lin | ................... H04W 74/0833 |
| 2018/0049169 A1* | 2/2018 | Lin | ........................ H04L 5/0051 |
| 2018/0063835 A1* | 3/2018 | Abedini | ................ H04W 24/02 |
| 2018/0070192 A1* | 3/2018 | Lee | ......................... H04W 4/70 |

OTHER PUBLICATIONS

Mediatek, et al., "WF on carrier bandwidth for initial access in NR," R1-168483, 3GPP TSG-RAN1 Meeting #86, Gothenburg, Sweden, Aug. 22-26, 2016, 4 pages.

Nokia, et al., "Basic Principles for Initial Access and Mobility," R1-167294, 3GPP TSG-RAN WG1#86, Gotheburg, Sweden, Aug. 22-26, 2016, 6 pages.

NTT DoCoMo, Inc., "Discussion on initial access and mobility for NR," R1-167912, 3GPP TSG RAN WG1 Meeting #86, Gothenburg, Sweden, Aug. 22-26, 2016, 12 pages.

Samsung, "Discussion on numerology aspects of NR synchronization signal," R1-166795, 3GPP TSG RAN WG1 Meeting #86, Gothenburg, Sweden, Aug. 22-26, 2016, 7 pages.

Huawei, HiSilicon, "Discussion on UE behavior on mixed numerology carrier", 3GPP TSG RAN WG1 Meeting #86bis, R1-1609425, 4 pages.

Supplementary European Search Report dated Jul. 25, 2019 in connection with European Patent Application No. 17 85 6657, 7 pages.

* cited by examiner

FIG. 2B

```
PRACH-ConfigSIB ::=            SEQUENCE {
    rootSequenceIndex              INTEGER (0..837),
    prach-ConfigInfo               PRACH-ConfigInfo
}

PRACH-ConfigInfo ::=           SEQUENCE {
    prach-ConfigIndex              INTEGER (0..63),
    highSpeedFlag                  BOOLEAN,
    zeroCorrelationZoneConfig      INTEGER (0..15),
    prach-FreqOffset               INTEGER (0..94)
}
```

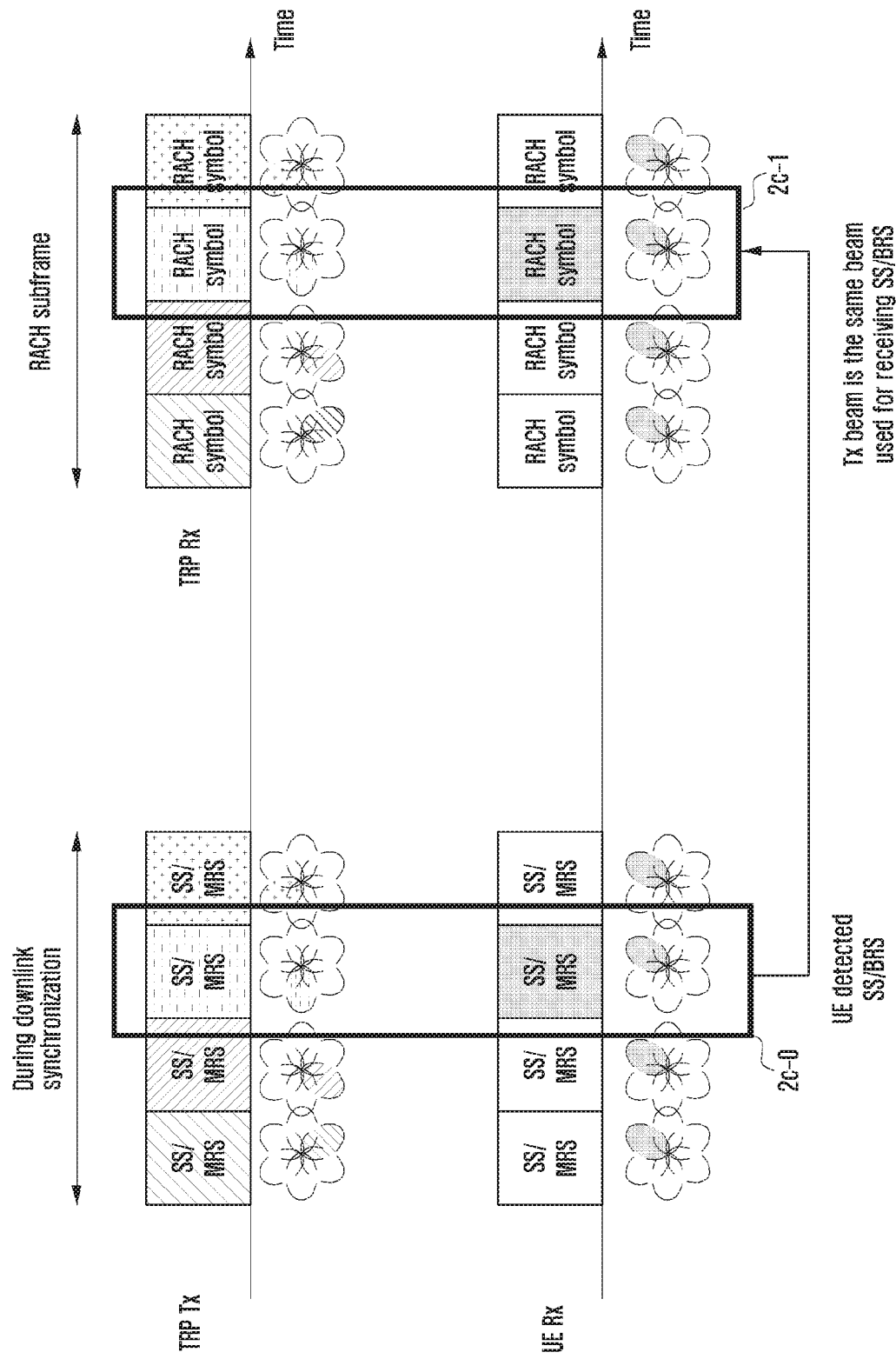

FIG. 2D

```
PRACH-ConfigSIB ::=        SEQUENCE {
    prach-ConfigInfo_Withreciprocity        PRACH-ConfigInfo_Withreciprocity
    :
    :
}

PRACH-ConfigInfo_Withreciprocity ::=        SEQUENCE {
    numberOfBeams       INTEGER (0..N-1),
    :
    :
}
```

FIG. 2F

```
PRACH-ConfigSIB ::=                    SEQUENCE {
    ..
    prach-ConfigInfo_Withreciprocity   PRACH-ConfigInfo_Withreciprocity
    ..
}

PRACH-ConfigInfo_Withreciprocity ::=                   SEQUENCE {
    ..
    numberOfBeams                      INTEGER (0..N-1),
    numberOfResources                  INTEGER (0..M-1),

..
}
```

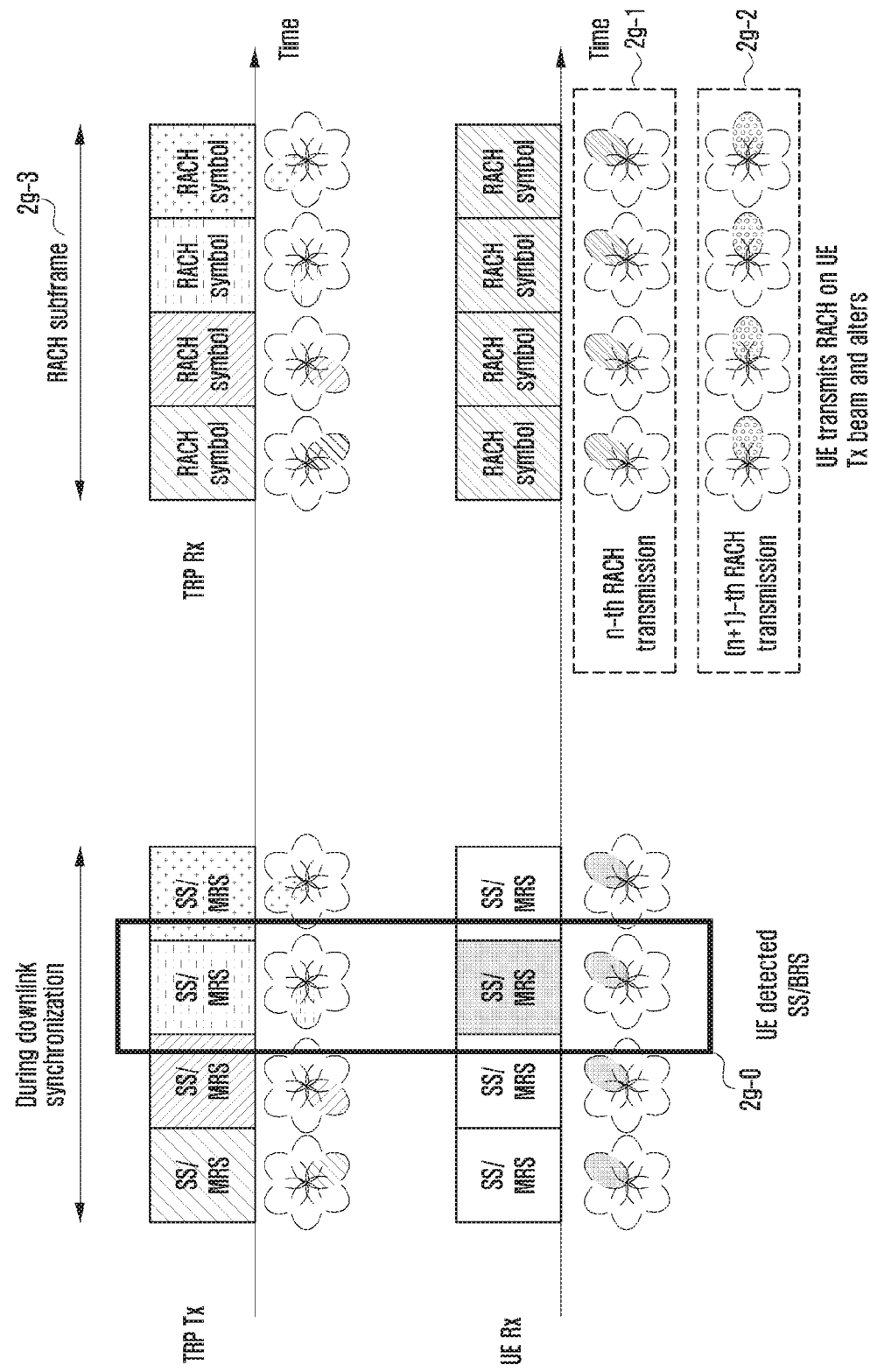

FIG. 2H

```
PRACH-ConfigSIB ::=                      SEQUENCE {
    ..
    prach-ConfigInfo_Withoutreciprocity   PRACH-ConfigInfo_Withoutreciprocity
    ..
}

PRACH-ConfigInfo_Withoutreciprocity ::=              SEQUENCE {
    ..
    numberOfBeams           INTEGER (0..N-1),
    numberOfResources       INTEGER (0..M-1),
    ..
}
```

FIG. 21

```
PRACH-ConfigSIB ::=                    SEQUENCE {
    ..
    prach-ConfigInfo_Withoutreciprocity    PRACH-ConfigInfo_Withoutreciprocity
    ..
}

PRACH-ConfigInfo_Withoutreciprocity ::=              SEQUENCE {
    ..
    numberOfSubframes              INTEGER [0,..P-1],
    ..
}
```

FIG. 2M

```
PRACH-ConfigSIB ::=        SEQUENCE {
    BeamReciprocity        BOOLEAN,
    ..
}
```

FIG. 2N

```
PRACH-ConfigSIB ::=              SEQUENCE {
    prach-ConfigInfo_Withreciprocity    PRACH-ConfigInfo_Withreciprocity,
    ..
}
```

FIG. 20

```
PRACH-ConfigSIB ::=                    SEQUENCE {
  prach-ConfigInfo_Withoutreciprocity    PRACH-ConfigInfo_Withoutreciprocity,
  ..
}
```

FIG. 2P

```
PRACH-ConfigInfo ::=            SEQUENCE {
    prach-ConfigIndex               INTEGER (0..63),
    highSpeedFlag                   BOOLEAN,
    zeroCorrelationZoneConfig       INTEGER (0..15),
    prach-FreqOffset                INTEGER (0..94)
    ParameterInfo                   BOOLEAN,
    If ParameterInfo ==0
        numberOfBeams                   INTEGER (0..N-1),
        numberOfResources               INTEGER (0..M-1),
    else
        numberOfSubframes                   INTEGER (0..P-1),
    or
        numberOfBeams                   INTEGER (0..N-1),
        numberOfResources               INTEGER (0..M-1),
    end
}
```

FIG. 2V

| Preamble format | | #of Sequence | TCP | TSEQ | TGP | Path profile [TS] | Path profile [us] | Maximum Cell radius [meter] | Use case |
|---|---|---|---|---|---|---|---|---|---|
| A | 0 | 1 | 144 | 2048 | 0 | 48 | 1.56 | 469 | TA is already known or Very small cell |
|   | 1 | 2 | 288 | 4096 | 0 | 96 | 3.13 | 938 | Small cell |
|   | 2 | 4 | 576 | 8192 | 8192 | 144 | 4.69 | 2,109 | Normal cell |
|   | 3 | 6 | 864 | 12288 | 12288 | 144 | 4.69 | 3,516 | Normal cell |
| B | 0 | 1 | 144 | 2048 | 0 | 48 | 1.56 | 469 | TA is already known or Very small cell |
|   | 1 | 2 | 192 | 4096 | 96 | 96 | 3.13 | 469 | Small cell |
|   | 2 | 4 | 360 | 8192 | 216 | 144 | 1.44 | 1,055 | Normal cell |
|   | 3 | 6 | 504 | 12288 | 360 | 144 | 4.69 | 1,758 | Normal cell |
|   | 4 | 12 | 936 | 24576 | 792 | 144 | 4.69 | 3,867 | Normal cell |
| C | 0 | 1 | 1240 | 2048 | 0 | 144 | 4.69 | 5380 | Normal cell |
|   | 1 | 2 | 1384 | 4096 |   | 144 | 4.69 | 6000 | Normal cell |

METHODS AND APPARATUS FOR SUPPORTING MULTIPLE SERVICES IN WIRELESS COMMUNICATION SYSTEM

CROSS-REFERENCE TO RELATED APPLICATION(S) AND CLAIM OF PRIORITY

This application is related to and claims priority to Korean Patent Application No. 10-2016-0125955 filed on Sep. 29, 2016, and Korean Patent Application No. 10-2017-0045199 filed on Apr. 7, 2017, the contents of which are incorporated herein by reference.

TECHNICAL FIELD

The present disclosure relate to a wireless communication system, and more particularly, to a method and an apparatus for supporting various services in a wireless communication system. Further, the present disclosure relates to a random access procedure design during a beamforming based initial access.

BACKGROUND

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a beyond 4G network communication system or a post LTE system.

To achieve a high data transmission rate, the 5G communication system is considered to be implemented in a very high frequency (mmWave) band (e.g., like 60 GHz band). To relieve a path loss of a radio wave and increase a transfer distance of the radio wave in the very high frequency band, in the 5G communication system, beamforming, massive MIMO, full dimensional MIMO (FD-MIMO), array antenna, analog beam-forming, and large scale antenna technologies have been discussed.

Further, to improve a network of the system, in the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed.

In addition to this, in the 5G system, hybrid FSK and QAM modulation (FQAM) and sliding window superposition coding (SWSC) that are an advanced coding modulation (ACM) scheme and a filter bank multi carrier (FBMC), a non orthogonal multiple access (NOMA), and a sparse code multiple access (SCMA) that are an advanced access technology, and so on have been developed.

Meanwhile, the Internet is evolved from a human-centered connection network through which a human being generates and consumes information to the Internet of Things (IoT) network that transmits/receives information between distributed components such as things and processes the information. The Internet of Everything (IoE) technology in which the big data processing technology, etc., is combined with the IoT technology by connection with a cloud server, etc., has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things has been researched. In the IoT environment, an intelligent Internet technology (IT) service that creates a new value in human life by collecting and analyzing data generated in the connected things may be provided. The IoT may be applied to fields, such as a smart home, a smart building, a smart city, a smart car or a connected car, a smart grid, health care, smart appliances, and an advanced healthcare service, by fusing and combining the existing information technology (IT) with various industries.

Therefore, various tries to apply the 5G communication system to the IoT network have been conducted. For example, the 5G communication technologies, such as the sensor network, the machine to machine (M2M), and the machine type communication (MTC), have been implemented by techniques such as the beamforming, the MIMO, and the array antenna. The application of the cloud radio access network (cloud RAN) as the big data processing technology described above may also be considered as an example of the fusing of the 5G communication technology with the IoT technology.

SUMMARY

To address the above-discussed deficiencies, it is a primary object to provide a method and an apparatus for efficiently operating a base station and a terminal, if various services having different numerologies coexist in one system which is one of features of a 5G communication system.

Another object of the present disclosure is directed to provision of a method and an apparatus capable of efficiently performing a random access procedure by receiving or determining, by a terminal, beam reciprocity (or beam correspondence) of a base station.

Objects of the present disclosure are not limited to the above-mentioned objects. That is, other objects that are not mentioned may be obviously understood by those skilled in the art to which the present disclosure pertains from the following description.

Various embodiments of the present disclosure are directed to the provision of a method of a terminal in a wireless communication system, including: receiving a synchronization signal from a base station; and receiving a physical broadcasting channel (PBCH) using numerology used for a transmission of the synchronization signal among a plurality of numerologies that the terminal supports.

Various embodiments of the present disclosure are directed to the provision of a terminal in a wireless communication system, including: a transceiver configured to transmit and receive a signal; and a controller coupled with the transceiver and configured to receive a synchronization signal from a base station and to receive a physical broadcasting channel (PBCH) using numerology used for a transmission of the synchronization signal among a plurality of numerologies that the terminal supports.

Various embodiments of the present disclosure are directed to the provision of a method of a base station in a wireless communication system, including: transmitting a synchronization signal to a terminal; and transmitting a physical broadcasting channel (PBCH) using numerology used for a transmission of the synchronization signal among a plurality of numerologies that the terminal supports.

Various embodiments of the present disclosure are directed to the provision of a base station in a wireless communication system, including: a transceiver configured to transmit and receive a signal; and a controller coupled with the transceiver and configured to transmit a synchronization signal to a terminal and to transmit a physical broadcasting channel (PBCH) using numerology used for a transmission of the synchronization signal among a plurality of numerologies that the terminal supports.

Various embodiments of the present disclosure are directed to the provision of a method of a terminal including: receiving information on beam reciprocity from a base station; identifying a parameter for transmitting a random access preamble form the information on the beam reciprocity; and transmitting the random access preamble to the base station according to the confirmed parameter.

Various embodiments of the present disclosure are directed to the provision of a terminal including: a transceiver configured to transmit and receive a signal; and a controller coupled with the transceiver and configured to receive information on beam reciprocity from a base station, to identify a parameter for transmitting a random access preamble form the information on the beam reciprocity, and to transmit the random access preamble to the base station according to the confirmed parameter.

Various embodiments of the present disclosure are directed to the provision of a method of a base station including: transmitting information on beam reciprocity to a terminal; and receiving a random access preamble from the terminal according to a identified parameter from the information on the beam reciprocity.

Various embodiments of the present disclosure are directed to the provision of a base station including: a transceiver configured to transmit and receive a signal; and a controller coupled with the transceiver and configured to transmit information on beam reciprocity to a terminal and to receive a random access preamble from the terminal according to a identified parameter from the information on the beam reciprocity.

According to the present disclosure, the terminal can efficiently receive and transmit control information and data information in a scenario where various services having different requirements coexist.

In addition, according to the present disclosure, the terminal can transmit the random access channel (RACH) by setting the RACH configuration to be different based on the information notifying whether the beam reciprocity (or beam correspondence) of the base station included in the system information block (SIB) is established.

The effects that may be achieved by the embodiments of the present disclosure are not limited to the above-mentioned objects. That is, other effects that are not mentioned may be obviously understood by those skilled in the art to which the present disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2B illustrates a RACH configuration information transmitted in an SIB.

FIG. 2C illustrates an RACH transmission when beam reciprocity is established.

FIG. 2D illustrates a RACH configuration information added to the SIB when the beam reciprocity of the base station is established.

FIG. 2F illustrates an RACH configuration for using a plurality of RACH resources when the beam reciprocity of the base station is established.

FIG. 2G illustrates an RACH transmission when the beam reciprocity of the base station is not established.

FIG. 2H illustrates an RACH configuration including a beam operation of the base station.

FIG. 2I illustrates an RACH configuration including the beam operation of the base station.

FIG. 2M illustrates a method for notifying information, which notifies whether the beam reciprocity of the base station is established, via an SIB.

FIG. 2N illustrates a method for notifying whether beam reciprocity of a base station is established.

FIG. 2O illustrates a method for notifying whether beam reciprocity of a base station is not established.

FIG. 2P illustrates a method for distinguishing an indication notifying RACH configuration A (configuration in which beam reciprocity is assumed) or RACH configuration B (configuration in which beam reciprocity is not assumed) within the RACH configuration.

FIG. 2V illustrates parameters of the RACH preamble format according to an embodiment of the disclosure.

DETAILED DESCRIPTION

Figure 1A:
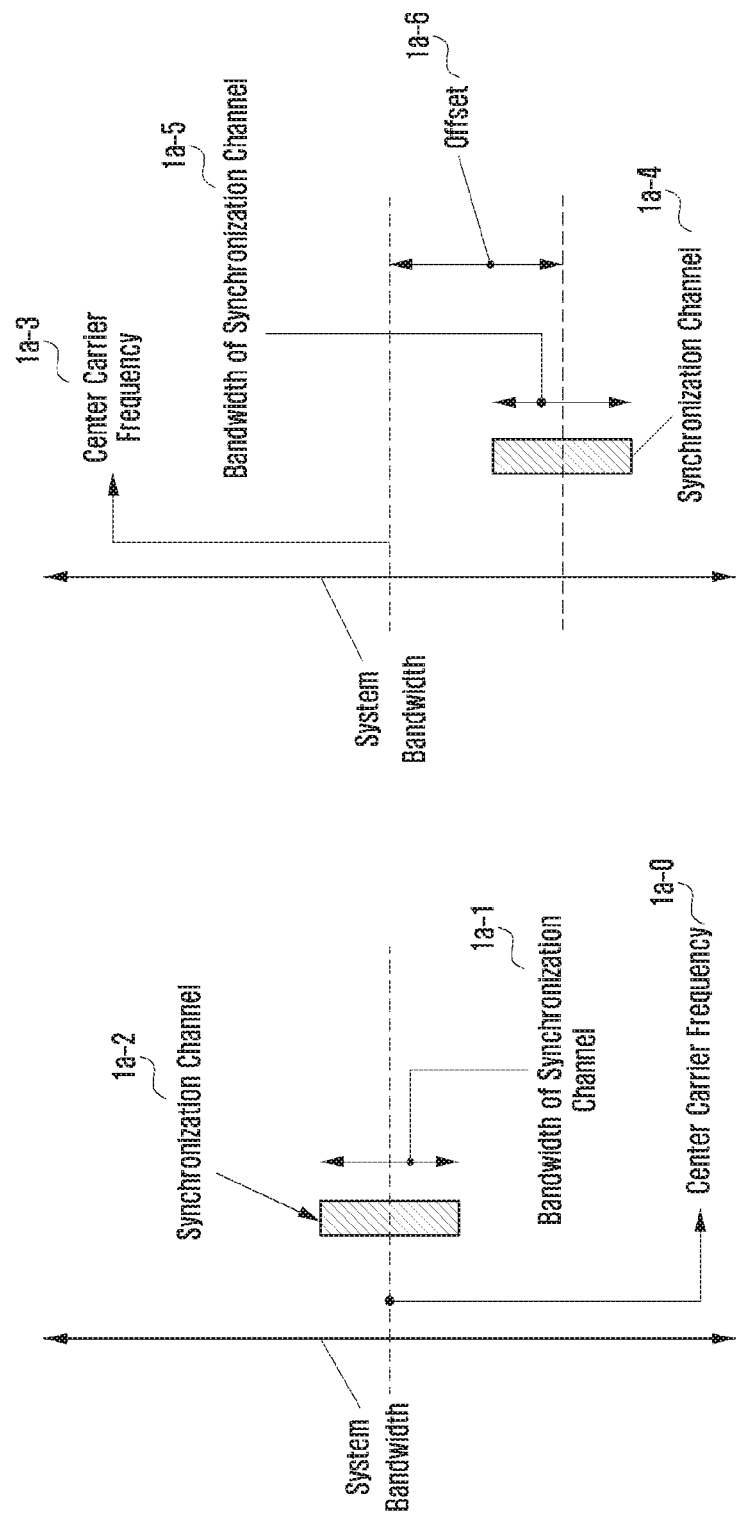
FIG. 1A illustrates a transmission of a synchronization channel according to an embodiment of the disclosure.

FIGS. 1A through 2X, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function (s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term '~unit' used in the present embodiment means software or hardware components such as FPGA and ASIC and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more CPUs within a device or a security multimedia card.

First Embodiment

Efforts to develop an improved 5G communication system after the commercialization of the 4G communication system have been conducted.

The main feature of the 5G communication system is to support various service scenarios having different requirements compared to the 4G communication system. Here, the requirements may mean latency, data rate, battery life, and the like.

For example, an enhanced mobile broadband (eMBB) service aims at a data transmission rate that is 100 times or higher than that of the 4G communication system and may be regarded as a service for supporting fast growing user data traffic. As another example, an ultra reliable and low latency (URLL) service aims at very high data transmission/reception reliability and very low latency compared to 4G communication system, and may be usefully used for services using an autonomous vehicle, an e-health, a drone, or the like. As another example, a massive machine-type-communication (mMTC) service aims to support a larger number of device-to-device communications per single area than a 4G communication system, and is an evolved service of the 4G MTC such as smart metering.

In the 4G wireless communication system, various services may coexist. For example, a normal LTE cellular communication service, a device-to-device (D2D) communication service, a machine-type-communication (MTC) service, and a multicast broadcast multimedia service (MBMS) communication service, or the like may coexist. A terminal supporting these different services basically supports a normal LTE cellular service for a synchronization procedure with a base station and a system information acquisition. For example, a terminal supporting the D2D communication service performs a downlink synchronization process with the base station and acquires master system information (MIB), before acquiring system information (e.g., resource allocation information or the like which is used for the D2D operation) associated with an D2D operation from the base station. In another example, a terminal supporting an MBMS communication service performs a downlink synchronization process with the base station and acquires the master system information (MIB), before acquiring system information (e.g., MBMS subframe information or the like) associated with an MBMS reception from the base station.

To support these different services, the conventional 4G system always uses the same subcarrier spacing (15 kHz), a transmission bandwidth (72 subcarriers: 1.08 MHz) having the same size, the same FFT Size (128 FFT Size) regardless of a bandwidth used in the 4G system, thereby transmitting a synchronization signal and the system information. Therefore, the terminal can receive the synchronization signal and the system information regardless of the service (for example, D2D communication service, MBMS communication service or the like) supported by the terminal Unlike the 4G communication system mentioned above, the 5G communication system may consider the use of different numerologies for each service to satisfy different requirements for each service. In this case, the numerology may mean at least one of a subcarrier spacing, an orthogonal frequency division multiplexing (OFDM) symbol length (or a single carrier-frequency division multiplexing (SC-FDM) symbol length), a transmission bandwidth, an FFT size, and a CP Length. For example, to satisfy the short latency requirement, the URLLC service may use subcarrier spacings (e.g., 30 kHz, 60 kHz) larger than the conventional 4G communication system (use of a 15 kHz subcarrier spacing). At this time, since the subcarrier spacing is doubled from 15 kHz to 30 kHz, the OFDM (or SC-FDM) symbol length may be reduced twice. Therefore, the latency may be reduced by using a short symbol length in the URLLC service.

The synchronization signal of the 4G communication system consists of a primary synchronization signal (PSS) and a secondary synchronization signal (SSS). The PSS uses a Zadoff-Chu (ZC) sequence of length 63 and is transmitted via 62 subcarriers (one of 63 subcarriers is punctured by a DC subcarrier). Since the length of the sequence used for the synchronization signal affects the detection performance of the synchronization signal, to guarantee performance similar to the 4G synchronization signal, even the synchronization signal of the 5G communication system may use the sequence having the same length (length 63) or a length larger than that. However, because the subcarrier spacing has increased to 30 kHz, a two-fold transmission bandwidth is required for the sequence transmission of length 63 (i.e., doubled from 1.08 MHz to 2.16 MHz). If a specific base station supports only the URLLC using a 30 kHz subcarrier spacing, the terminal needs to be able to receive the synchronization signal and the system information transmitted through the 30 kHz subcarrier spacing.

On the other hand, the URLLC service may be supported using the same subcarrier spacing (15 kHz) as that of the conventional 4G communication system. For example, in the conventional 4G communication system, 1 transmission time interval (TTI) is a scheduling unit. In the case of the normal CP, the 1 TTI means 1 subframe (or 1 slot consisting of 7 symbols) consisting of 14 OFDM symbols (or SC-FDM symbols) and in case of an extended CP, the 1 TTI means 1 subframe (or 1 slot consisting of 6 symbols) consisting of 12 OFDM (or SC-FDM) symbols. To satisfy the short latency requirement of the URLLC service, a short TTI (e.g., 2 to 3 symbols) using a smaller number of symbols, a slot (e.g., 14 symbols), or a mini-slot (e.g., 1 to 6 symbols) may be used. In such a scenario, the base station may transmit the synchronization signal and the system information using the same numerology (e.g., 15 kHz subcarrier spacing) as the conventional 4G communication system. Therefore, the terminal needs to be able to receive the synchronization signal and the system information transmitted through the 15 kHz subcarrier spacing.

It may be determined which of numerologies the URLLC service will use according to a provider's preference and a coexistence scenario with other services. Therefore, the terminal supporting the URLLC service needs to be able to receive the synchronization signal and the system information that are transmitted using various numerologies for all possible scenarios.

As another example of the use of various numerologies, in the conventional 4G communication system, a center carrier frequency domain ranges from 700 MHz to 4 GHz, whereas in the 5G communication system, the center carrier frequency domain ranges from 700 MHz to 100 GHz for eMBB service support using a wide bandwidth (for example, 1 GHz). If the center carrier frequency is increasing (for example, 30 GHz, 60 GHz, etc.), a random frequency fluctuation occurring in a local oscillator of the base station and the terminal is increased, and thus phase noise is increased. The phase noise causes a common phase error and an inter-carrier interference (ICI), which is a major cause of deterioration in performance of systems (e.g., WiGig operated at 60 GHz) operated at a high center carrier frequency. Therefore, to solve the problem, a wide subcarrier spacing needs to be used if the center carrier frequency is increasing. In order that performance of a synchronization signal of a 5G system (for example, 240 kHz) in which a wide subcarrier spacing is used is designed to be similar to that of the conventional 4G communication system, as described above, the sequence length of the synchronizing length used in the 5G system needs to be similar to or longer than the conventional 4G communication system. At this time, since the 5G communication system operated in a high frequency band uses a wide subcarrier spacing, it is necessary to use a wider bandwidth for the transmission of the synchronization signal. For example, if the 5G communication system uses a sequence having the same length as the 4G communication system, then the 5G communication system requires a transmission bandwidth 16 times larger than that of the 4G communication system for the transmission of the synchronization signal (the 240 kHz subcarrier spacing is 16 times the 15 kHz subcarrier spacing).

On the other hand, in order to support the eMBB service requiring a large bandwidth, carrier aggregation may be used. In such a scenario, as the subcarrier spacing used for the transmission of the synchronization signal, 15 kHz which is the same as the conventional 4G communication system may be used.

Therefore, even the terminal supporting the eMBB service needs to be able to receive the synchronization signal and the system information that are transmitted using various numerologies. In addition, in the 5G communication system, various types of services using various numerologies may be defined without being limited to the above-described embodiments. As described above, to support forward compatibility for services which may be discussed in future, the terminal needs to flexibly support various numerologies.

Embodiments of the present disclosure to be described below will propose configurations for solving the above-mentioned problem. In other words, in the scenario in which various services having different requirements which is one of the features of the 5G communication system uses various numerologies, a method for efficiently acquiring, by a terminal, a synchronization signal and system information, perform a random access procedure, and then transmitting/receiving uplink data and downlink data will be described.

The present disclosure relates to a method of transmitting a downlink synchronization signal and system information, a random access method, and a method for transmitting/receiving uplink and downlink data to support various numerologies when various numerologies which may be supported in the 5G communication system coexist. In addition, the present disclosure relates to a method and an apparatus for operating a base station and a terminal for transmitting/receiving signals transmitted using various numerologies.

FIG. 1A illustrates a transmission of a synchronization channel (or synchronization signal) according to an embodiment of the disclosure. At this case, the synchronization channel (or synchronization signal) may be one synchronization signal consisting of one sequence or two or more synchronization signals each consisting of two or more sequences. In addition, it is characterized that the synchronization channel consists of one or two OFDM symbols.

For example, if the synchronization channel is two or more synchronization signals consisting of two or more sequences, the synchronization channel may consist of a primary synchronization signal (PSS) and a secondary synchronization signal (SSS) as in the LTE. The PSS is generated as a Zadoff-Chu sequence and includes information on a cell ID. The terminal acquires the information on the cell ID through the PSS detection and acquires timing information on a symbol/slot/subframe and information on a center carrier frequency of the system. On the other hand, the SSS is generated as an m-sequence and includes information on a cell ID Group. The terminal acquires the information on the cell ID Group through an SSS detection and is used to detect a radio frame synchronization.

As another example, the synchronization channel may be three synchronization signals consisting of two sequences. That is, the synchronization channel may consist of the PSS, the SSS, and the extended synchronization signal (ESS). At this time, the sequence and purpose of configuring the PSS and the SSS may be the same as the above-mentioned examples. Meanwhile, the ESS consists of the ZC-sequence in the same way as the PSS. In the hybrid-beamforming system, the ESS may include information on indexes of an orthogonal frequency division multiplexing (OFDM) symbol or a single carrier-frequency division multiplexing (SC-FDM) symbol.

As another example, the synchronization channel may be one synchronization signal consisting of one sequence. That is, the synchronization channel consists of one sequence like the PSS and may include information on a cell ID, a sector ID, or a transmission and reception point (TRP) ID.

Meanwhile, in various cases described above, the synchronization channel may be transmitted using various numerologies. At this time, the numerology means at least one of a subcarrier spacing of the synchronization signal, a cyclic prefix (CP) length of the synchronization signal, a synchronization channel bandwidth of the synchronous channel, and a fast Fourier transform size of the synchronization signal. For example, in the system which supports a center carrier frequency equal to or less than 6 GHz, the subcarrier spacing for the transmission of the synchronization channel may be 15 kHz, 30 kHz, or 60 kHz. The CP length of the synchronization signal may be either Normal CP or Extended CP. The transmission bandwidth of the synchronization channel may be various like 180 kHz, 1.4 MHz, and 5 MHz. The FFT Size of the synchronization signal has relation to the transmission bandwidth of the synchronization channel and the subcarrier spacing. For example, if 1.08 MHz is used as the transmission bandwidth at the 15 kHz subcarrier, a 128 FFT size may be used, and if 1.08 MHz is used as the transmission bandwidth at a 30 kHz subcarrier, a 64 FFT size may be used.

Graph (a) of FIG. 1A illustrates an example in which the synchronization channel is transmitted at the center carrier frequency of the system. Unlike this, graph (b) of FIG. 1A illustrates an example in which the synchronization channel is transmitted in a region other than the center carrier frequency of the system. Depending on the services (e.g. URLLC, eMBB, mMTC, etc.) that the system supports or depending on the carrier's preferences and the center carrier frequency at which the system is operated, the synchronization channel may be transmitted using various numerologies. In this way, if the synchronization channel is transmitted using various numerologies, the terminal knows or needs to know the information on the numerology used for the transmission of the synchronization channel to receive the synchronization channel.

More specifically, the information on the numerology for the transmission of the synchronization channel may be mapped to the sequence used in the synchronization channel. In other words, the numerology applied to the transmission of the synchronization channel (or synchronization signal) may be determined according to the sequence used for generation of the synchronization channel (or synchronization signal). For example, if the synchronization channel consists of two or more sequences, that is, if the synchronization signal is transmitted using sequence A1, sequence A2, and sequence A3, the terminal may know that the system uses subcarrier spacing A (for example, 15 kHz, 30 kHz, 60 kHz, etc.) based on the detection of the sequence A1. In addition, the terminal may know that the system uses the Normal CP based on the detection of the sequence A2 and know that the system uses the extended CP (CP having a length relatively longer than Normal CP) based on the detection of the sequence A3. As another example, if the synchronization channel consists of two sequences of sequence B1 and sequence B2, the terminal may acquire the information on the subcarrier spacing based on the detection of the sequence B1 and estimate the CP length in a blind way based on the sequence B2. In other words, the mapping relationship between the sequence A1 and the subcarrier spacing A, the mapping relationship between the sequence A2 and the normal CP, the mapping relationship between the sequence A3 and the extended CP, the mapping relationship between the sequence B1 and another subcarrier spacing, the mapping relationship between the sequence B2 and the specific CP length, or the like may be predefined, and the base station and the terminal may previously share the mapping relationships. By the mapping relationship, the base station may implicitly notify the terminal of the information on the specific numerology using the specific sequence, and the terminal may know the information on the specific numerology from the sequence of the synchronization channel (or synchronization signal).

The normal CP length or the extended CP length used at different subcarrier spacings may be different. For example, the normal CP length used in the subcarrier spacing A and the normal CP length used in the subcarrier spacing B may be different from each other. Similarly, the extended CP length used in the subcarrier spacing A and the extended CP length used in the subcarrier spacing B may be different from each other.

The transmission bandwidth of the synchronization channel may be different for each system. For example, the bandwidth of the synchronization channel used by the sequence A1 may be 1.08 MHz, and the bandwidth of the synchronization channel used by the sequence B1 may be 2.16 MHz. At this time, the FFT size used for the transmission of the sequence A1 and the sequence B1 may be the same. As another example, the bandwidth of the synchronization channel used by the sequence A1 and the bandwidth of the synchronization channel used by the sequence B1 may be the same (for example, 1.08 MHz). In this case, the FFT Size used for the transmission of the sequence A1 and the sequence B1 may different from each other (for example, 128 FFT in the case of the sequence A1 and 64 FFT in the case of the sequence B1).

As another example of transmitting the information on the numerology used for the transmission of the synchronization channel, the information on the specific numerology may be mapped to a transmission position of the synchronization channel. For example, if the synchronization channel is transmitted at the center carrier frequency of the system (1a-2, 1a-0) as illustrated in graph (a) FIG. 1A, the terminal recognizes that the numerology A (subcarrier spacing A1, transmission bandwidth A2 of the synchronization channel, FFT size A3, etc.) is used and performs the detection of the synchronization channel. On the other hand, if the synchronization channel 1a-4 is transmitted in a region other than the center carrier frequency 1a-3 of the system as illustrated in graph (b) of FIG. 1A (1a-6), the terminal recognizes that the numerology B (subcarrier spacing B1, transmission bandwidth B2 of the synchronization channel, FFT size B3, etc.) is used and performs the detection of the synchronization channel. The mapping relationship between the transmission region (or the transmission position on the frequency axis) of the synchronization channel and the numerology information is a value embedded in the base station and the terminal, and the terminal searches the synchronization channel using the embedded value and acquires numerology information. If the synchronization channel consists of two or more synchronization signals, the terminal detects one synchronization signal to acquire some (e.g., subcarrier spacing, bandwidth of the synchronization channel, FFT size, etc.) of the numerology information, the information is used for the detection of the remaining synchronization signals, and the remaining numerology information (for example, CP length) may be acquired based on the detection of the remaining synchronization signals.

Figure 1B:
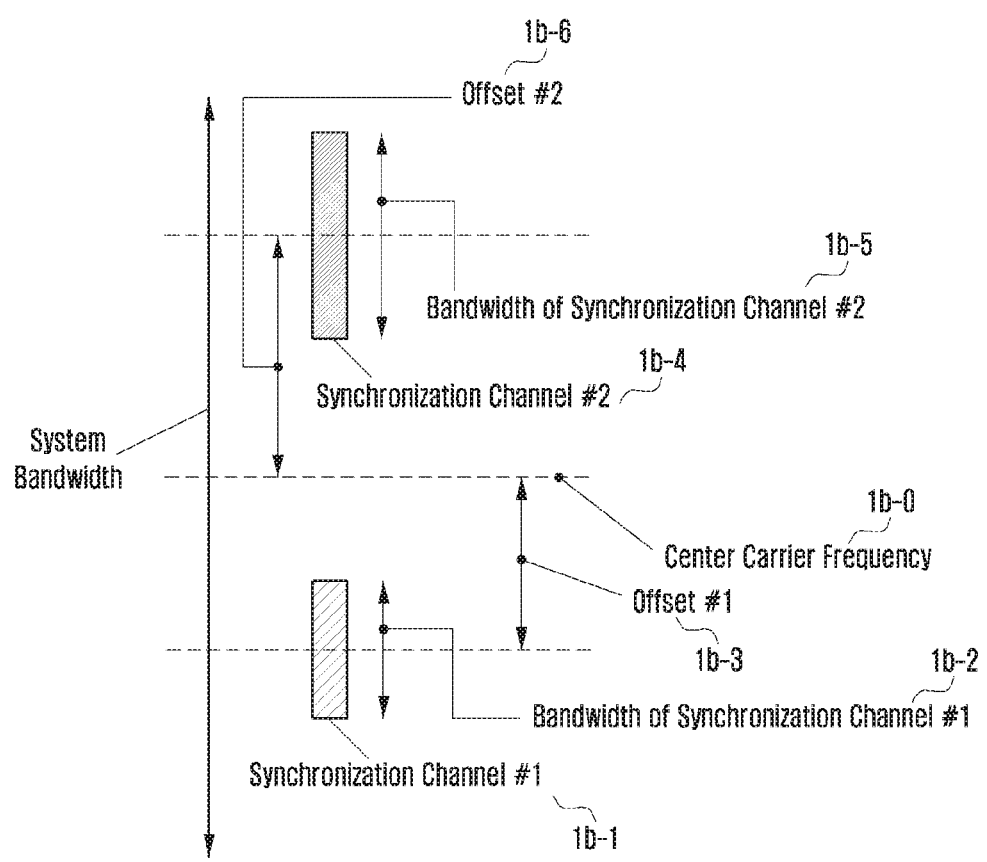
FIG. 1B illustrates a transmission of the synchronization channel according to an embodiment of the disclosure.

FIG. 1B illustrates a transmission of the synchronization channel according to an embodiment of the disclosure. Unlike FIG. 1A, FIG. 1B illustrates an example in which one system transmits two or more synchronization channels using different numerologies. A synchronization channel #1 1b-1 transmitted at a frequency apart from the center carrier frequency 1b-0 by offset #1 1b-3 may use the numerology 1 and a synchronization channel #2 1b-4 transmitted at a frequency apart from the center carrier frequency 1b-0 by offset #2 1b-6 may use the numerology 2. At this time, the numerology means one or at least one of the subcarrier spacing of the synchronization signal, the cyclic prefix (CP) length of the synchronization signal, the synchronization channel bandwidth of the synchronous channel, and the fast Fourier transform size of the synchronization signal.

FIG. 1B illustrates that the synchronization channel #1 and the synchronization channel #2 are transmitted at different frequencies at the same time but they may be transmitted at different frequencies at different times. For example, the synchronization channel #1 1b-1 using the numerology 1 is transmitted at intervals of N1 ms at the center carrier frequency or a frequency apart from the center carrier frequency by the offset #1 1b-3, and the synchronization channel #2 1b-4 using the numerology 2 may be transmitted at intervals of N2 ms at a frequency apart from the center carrier frequency by the offset #2 1b-6. More specifically, the terminal performs synchronization through the synchronization channel #1 1b-1 transmitted at intervals of N1 ms and acquires information on the numerology 1. At this time, the base station may transmit an additional synchronization channel #2 1b-4 in a UE-specific or cell-specific manner according to a request of the terminal. If the base station transmits the synchronization channel #2 1b-4 by the request of the terminal, the information on the numerology 2 and the N2 ms information used in the synchronization channel #2 1b-4 may be signaled to the terminal in the UE-specific or the cell-specific manner.

If a specific base station supports both of the mMTC and eMBB, since the requirements of the mMTC and the eMBB are different from each other, the numerology used for the mMTC and the numerology used for the eMBB may be different from each other. That is, the subcarrier spacing and the bandwidth for the mMTC service may be much smaller than the subcarrier spacing and the bandwidth for the eMBB service. Under the assumption, terminal A that wants to access the base station may support only the mMTC service, and another terminal B may support only the eMBB service. The base station may transmit two or more synchronization channels using different numerologies so as to receive the synchronization channel based on the numerology supported by each terminal. At this time, since the base station does not know whether a terminal supporting any service tries to access, the base station may always transmit different synchronization channels using different numbers. In this case, a lot of overhead may occur due to the synchronization channel transmission. Accordingly, the base station may define a default numerology and always transmit one synchronization channel using the default numerology (for example, use the numerology 1 as the default numerology). At this time, when the terminal requests to perform transmission/reception of data and control information using the numerology 2 after the base station acquires information on whether or not the terminal supporting numerology (for example, numerology 2) different from the numerology 1 used by the base station is accessed (after capability negotiation) or after an RRC connection setup, the base station may transmit the additional synchronization channel #2. In other words, the base station and the terminal may perform the initial access procedure by using a specific default numerology and then transmit/receive additional information on different numerologies according to the request or communication process of the terminal.

Figure 1C:
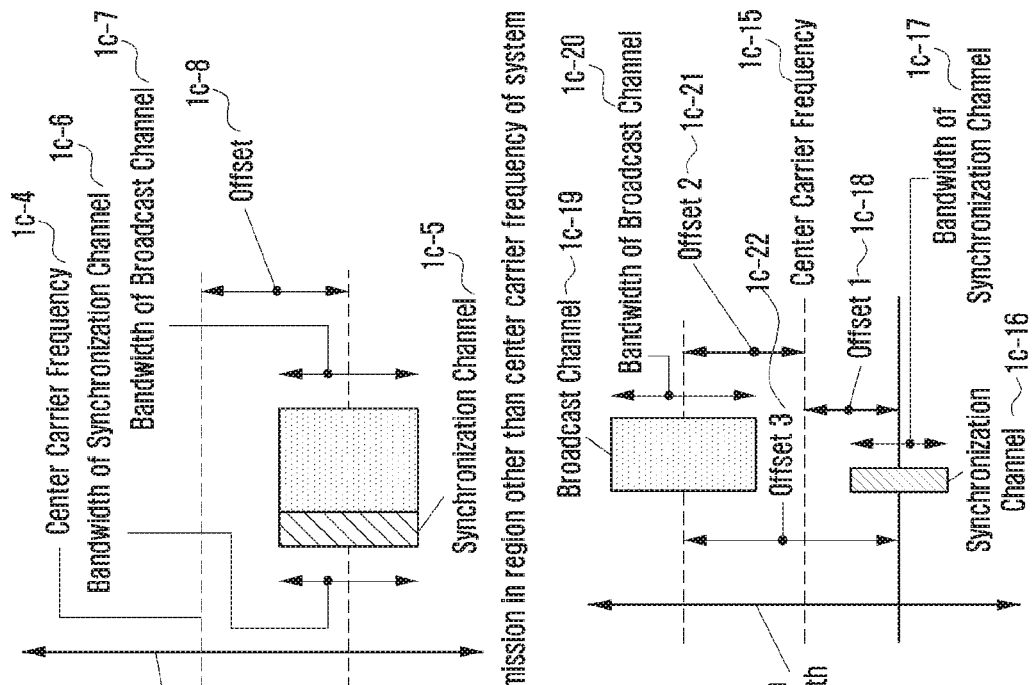
FIG. 1C illustrates a transmission of a synchronization channel and a broadcasting channel according to an embodiment of the disclosure.

FIG. 1C illustrates a transmission of the synchronization channel and the broadcasting channel according to an embodiment of the disclosure. Graphs (a) and (b) of FIG. 1C are diagrams illustrating an example in which the numerology used for the transmission of the synchronization channel is similarly applied even to a transmission of a physical broadcasting channel (PBCH). Unlike this, graphs (c) and (d) of FIG. 1C are diagrams illustrating an example in which the numerology used for the transmission of the synchronization channel and the numerology used for the transmission of the broadcasting channel are different from each other.

More specifically, as illustrated in graph (a) of FIG. 1C, a synchronization channel 1c-1 and a broadcasting channel 1c-2 are transmitted at a center carrier frequency 1c-0 of the system, and the synchronization channel 1c-1 and the broadcasting channel 1c-2 may use the same numerology. As another example, as illustrated in graph (b) of FIG. 1C, a synchronization channel 1c-5 and the broadcasting channel are transmitted in a region 1c-8 other than a center carrier frequency 1c-4 of the system, and the synchronization channel 1c-5 and the broadcasting channel can use the same numerology (1c-6, 1c-7). At this time, as described in FIG. 1A, the numerologies used in the synchronization channel and the broadcasting channel may be identified by the terminal due to an offset difference between the center carrier frequency of the system and the frequency at which the synchronization channel is transmitted. In other words, the numerologies used in the synchronization channel and the broadcasting channel may be determined by the transmission region (or transmission position) of the corresponding channel.

Meanwhile, graphs (c) and (d) of FIG. 1C, if the numerology used in the synchronization channel and the numerology used for the broadcasting channel are different from each other, in order for the terminal to decode the broadcasting channel, the information on the numerology used for the broadcasting channel is required. As in graph (c) of FIG. 1C, if a synchronization channel 1c-10 and a broadcasting channel 1c-11 are transmitted (1c-9, 1c-14), some of the synchronization signals transmitted to the synchronization channel 1c-10 may provide the information on the numerology of the broadcasting channel 1c-11. As in graph (d) of FIG. 1C, if a synchronization channel 1c-16 and a broadcasting channel 1c-19 are transmitted through different frequencies (i.e., different offsets 1c-18 and 1c-21) within the same system bandwidth, offset values 1c-18, 1c-21, and 1c-22 may include the information on the numerology of the broadcasting channel. In other words, the offset values 1c-18, 1c-21, and 1c-22 may indicate the numerology of the broadcasting channel. For example, the information on the numerology used for the broadcasting channel 1c-19 may be transmitted through an offset (represented by offset 2 1c-21 in graph (d) of FIG. 1C) value between a center carrier frequency 1c-15 of the system and a frequency at which the broadcasting channel 1c-19 is transmitted or an offset (represented by offset 3 1c-22 in graph (d) of FIG. 1C) value between the frequency at which the synchronization channel 1c-16 is transmitted and the frequency at which the broadcasting channel is transmitted. The offset value may be embedded in the terminal or may be transmitted through one of the synchronization signals transmitted to the synchronization channel. That is, the sequence A of the synchronization signal 1c-16 means a predetermined offset A, and the offset A may be mapped to the numerology A.

Figure 1D:
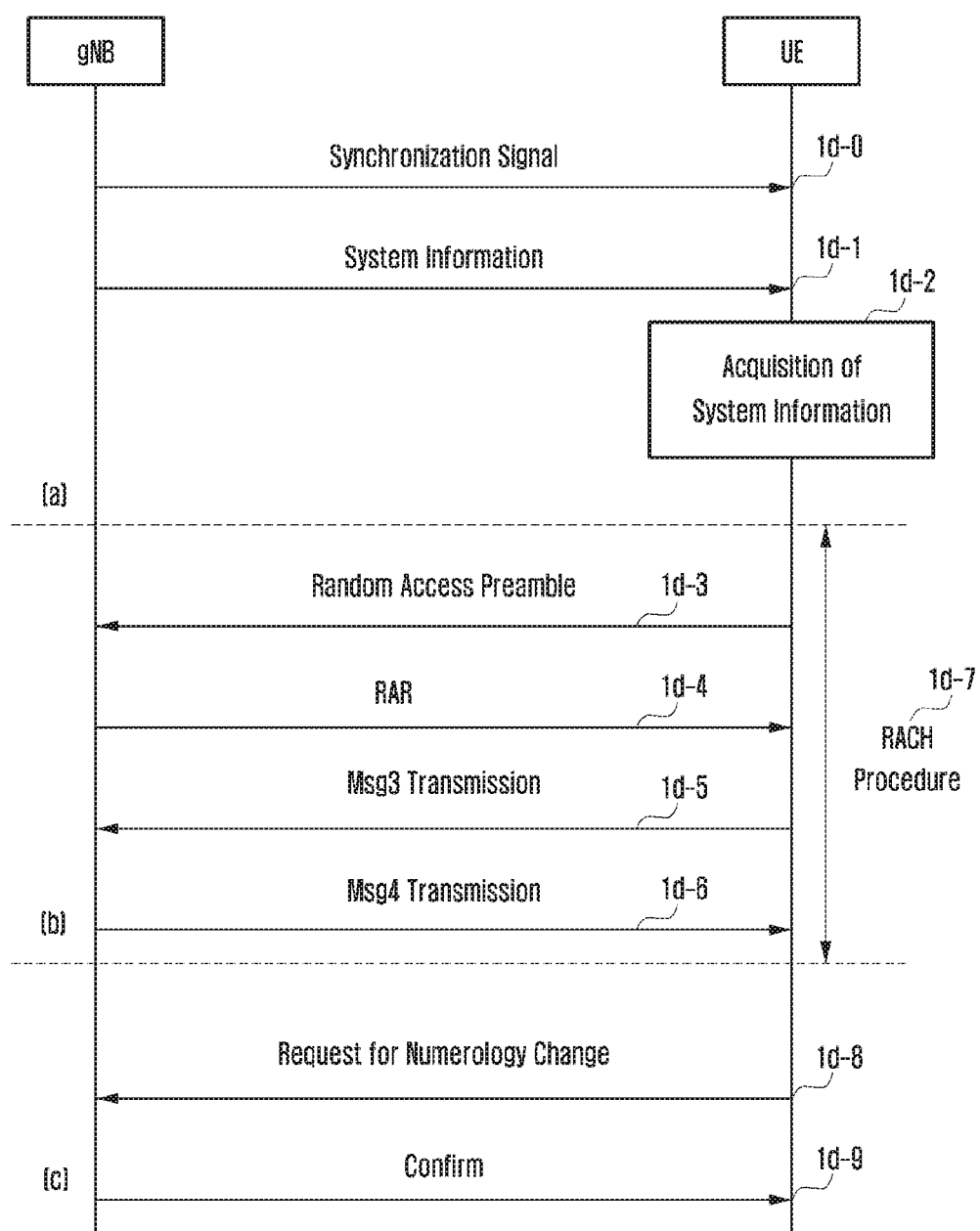
FIG. 1D illustrates a procedure of a numerology information transmission according to an embodiment of the disclosure.

FIG. 1D illustrates a procedure of a numerology information transmission between the base station and the terminal according to an embodiment of the disclosure. More specifically, if one system (base station) supports two or more different numerologies, the information on the numerology may be transmitted in a downlink synchronization process and a system information acquisition process as illustrated in graph (a) of FIG. 1D. Also, as illustrated in FIG. 1D, the numerology information may be transmitted in a random access procedure performed after the downlink synchronization process and the system information acquisition process. After the random access procedure as illustrated in graph (c) of FIG. 1, the numerology information may be transmitted from the base station to the terminal in the RRC connected state.

As illustrated in section (a) of FIG. 1D, if the numerology information is transmitted in the downlink synchronization process and the system information acquisition process, the numerology information may be transmitted according to the embodiments described with reference to FIGS. 1A, 1B, and 1C. That is, the terminal may acquire the numerology information from a synchronization signal of the synchronization channel transmitted from the base station that has performed the downlink synchronization. At this time, the base station may set and operate the default numerology as follows.

First, the default numerology refers to the numerology used for the transmission of the synchronization channel (or synchronization signal), and the terminal uses the default numerology before receiving separate signaling for the change in the numerology from the base station. In other words, the default numerology may refer to a predetermined numerology used for the transmission of the synchronization channel (or synchronization signal). According to the above-described embodiment, the default numerology may be determined according to a center carrier frequency value (or an offset value from the system bandwidth) at which the synchronization channel (or synchronization signal) is transmitted. According to an example, if the terminal detects the synchronization signal from a sync roster, the terminal knows the default numerology according to the center carrier frequency (or offset) of the synchronization signal and uses the default numerology as the numerology of the synchronization signal. Next, the terminal detects the broadcasting channel through the default numerology. At this time, as illustrated in FIGS. 1A, 1B, and 1C, even if the center carrier frequencies of the broadcasting channels and the transmission bandwidths of the synchronization channels (synchronization signals) are different, the center carrier frequencies may be the same as each other. In other words, the broadcasting channel and the synchronization channel may be transmitted while the center carrier frequencies thereof being aligned with each other.

More specifically, the terminal decodes a broadcasting channel using numerology information acquired through a synchronization channel 1d-0 received through the corresponding default numerology, and is operated using the acquired numerology information before there is separate signaling from the base station. For example, if there is no separate signaling for the change in the numerology, the terminal may apply and use the same numerology (for example, default numerology) for a transmission of a system information block (SIB), a downlink control channel (physical downlink control channel (PDCCH)), a downlink data channel (physical downlink shared channel (PDSCH)), a random access channel (physical random access channel (PRACH)), an uplink control channel (physical uplink control channel (PUCCH)), and an uplink data channel (physical uplink shared channel (PUSCH)). If the base station notifies the terminal of the use of numerology different from the numerology (i.e., default numerology) through the SIB, MIB or UE-specific RRC signaling, the terminal changes the numerology to receive the downlink data/control information or transmit the uplink data/control information (1d-1, 1d-2).

As another example, the default numerology requests the terminal to allow the base station to change the numerology, and may be defined as numerology which is used before receiving a response to the change in the numerology from the base station (when the base station permits the request of the terminal). The terminal uses the numerology information acquired through the synchronization channel to transmit/receive all data information and control information after the RRC connection setup. After the RRC connection setup, the terminal may request the terminal to change the numerology (1d-8), and may use numerology different from the default numerology when permitting the change (1d-9).

The numerology used for the downlink transmitted from the base station to the terminal and the numerology used for the uplink transmitted from the terminal to the base station may be different from each other. In this case, the numerology information used for the downlink may be transmitted to the terminal as illustrated in FIGS. 1A, 1B, and 1C, and the numerology information used for the uplink may be transmitted from the base station to the terminal through the system information (MIB, SIB, remaining minimum system information (RMSI), or other system information (OSI)).

In another example, the default numerology used by cell A and the default numerology used by cell B may be different from each other. The terminal may acquire default numerology information of different cells through the synchronization channel. However, this may increase a blind detection frequency of the terminal for the numerology detection, thereby increasing power consumption of the terminal. Accordingly, a serving base station may transmit the cell ID of the neighboring base stations and the numerology information of the neighboring base stations to the serving base station through the system information (SIB, RMSI, or OSI) or the UE-specific RRC signaling.

Meanwhile, as illustrated in section (b) of FIG. 1D, the numerology different from the default numerology may be used in the random access process (1d-7). For example, if it is assumed that the numerology A is used in the downlink synchronization process and the system information acquisition process, the terminal may perform a random access preamble transmission using numerology A' (1d-3). At this time, the numerology A' used for the random access preamble transmission may be the same as or different from the numerology A. If the numerology A' and the numerology A are different from each other, the information on the numerology A' is a value promised by the terminal and the base station, and may be a value embedded in the base station and the terminal. As another example, the information on the numerology A' used for the random access preamble transmission may be transmitted from the base station to the terminal through the system information (i.e., MIB, SIB, RMSI or OSI).

After the terminal transmits the random access preamble to the base station, the base station transmits a random access response (RAR) to the terminal as a response thereto (1d-4). At this time, the base station may use the default numerology because it does not know the numerology used by the terminal (in particular, the bandwidth that the terminal may support). For example, the mMTC terminal may support only a small bandwidth (BW) compared to the eMBB terminal. As another example, the eMBB terminal A may support BW of 80 MHz, but another eMBB terminal B can support BW of 1 GHz. Since the base station does not know the information of the terminal, the base station needs to appropriately determine the bandwidth of the downlink control channel (PDCCH) for RAR transmission and the downlink data channel (PDSCH) for RAR transmission. The bandwidth may be a minimum value embedded in the base station and the terminal, or the base station may transmit the numerology information including the BW through the system information (i.e., MIB or SIB). The terminal may acquire the numerology information for RAR reception from the received system information and receive the RAR (1d-4).

In another example of section (b) of FIG. 1D, the terminal may transmit the information on the numerology that the terminal may support to the base station through Msg3 (1d-5). In other words, it may be assumed that the numerology (the synchronization channel and the broadcasting channel and the numerology used for the RAR transmission) used before the Msg3 transmission uses the default numerology. More specifically, for example, the base station uses a 15 kHz subcarrier spacing, a normal CP length, a 1.4 MHz bandwidth, and a 128 FFT size for the transmission of the synchronization channel, the broadcasting channel, and the RAR, and these parameters are values (a value embedded in the base station and the terminal or a value acquired by the terminal through the MIB, SIB, RMSI, or OSI) promised between the base station and the terminal. The terminal may transmit information on the numerology that the terminal can support to the base station using the MAC layer information (MAC control element (CE) or MAC payload) or upper layer information (RRC information) when transmitting the Msg3 (1d-5). The base station receiving the Msg3 acquires the information on the numerology that the terminal supports. The base station may transmit Msg4 to the terminal by applying the numerology information acquired from the terminal through Msg3 (1d-6). As another example, the base station may transmit the control information or the data information to the corresponding terminal by applying the numerology information acquired through the Msg3 after the RRC connection setup.

As illustrated in section (c) of FIG. 1D, after the RRC connection setup, the terminal may transmit the request for the change in the numerator to the base station (1d-8). For example, the base station may integrate a single synchronized channel, a broadcasting channel, and numerology used for RAR and Msg4 transmission into one and use it. The information on a numerology set that the base station may support may be transmitted to the terminal through the system information. After acquiring the system information, the terminal acquires the information on the numerology that the base station may support, and determines whether the numerology that the terminal may support is included in the information on the numerology set that the base station may support. If the numerology that the terminal may support is included in the numerology set that the base station may support, the terminal performs the request for the change in the numerology (1d-8). The request may be transmitted using the MAC layer information (MAC (control element) CE or MAC Payload) or the upper layer message (RRC) or may be transmitted to the base station through L1 signaling (e.g., mapped to an uplink control channel or uplink reference signal). As the response to this, the base station may inform the terminal whether the numerology has changed through the L1 Signaling (e.g., downlink control channel) (1d-9).

Figure 1E:
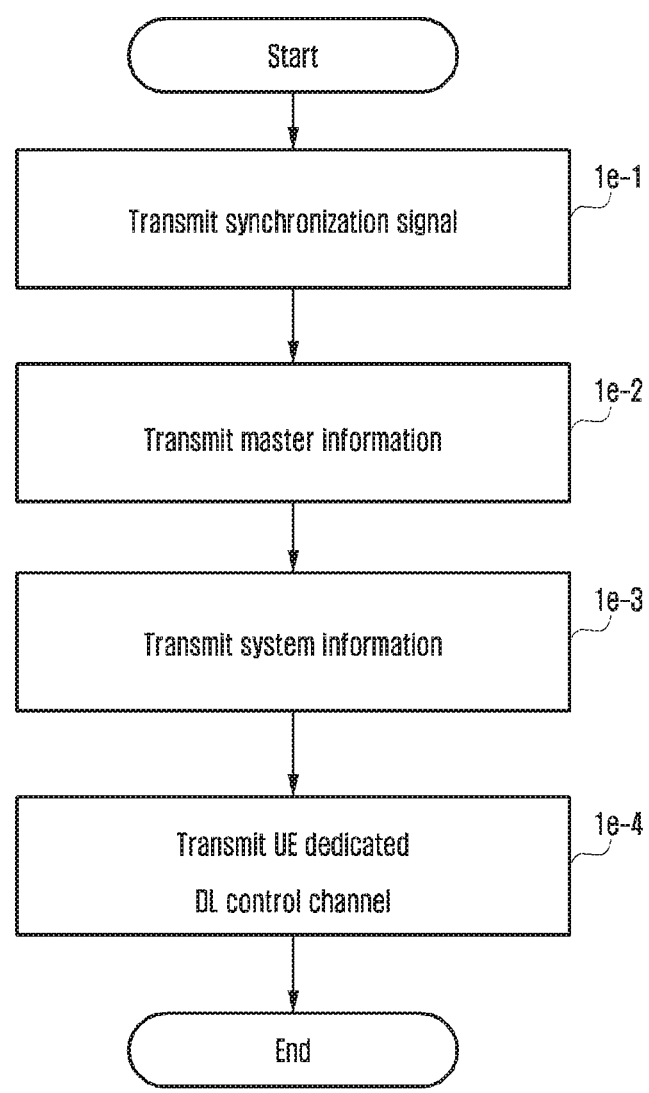
FIG. 1E illustrates an operation of a base station for the numerology information transmission according to an embodiment of the disclosure.

FIG. 1E illustrates an operation of a base station for the numerology information transmission according to an embodiment of the disclosure. More specifically, the case in which numerology information is transmitted through a synchronization signal transmitted through a synchronization channel is illustrated. The numerology information may be mapped to the center carrier frequency used by the system or may be mapped to a frequency at which the synchronization channel is transmitted if the synchronization channel is transmitted in the region other than the center carrier frequency that the system uses. In addition, if the synchronization channel is transmitted in the region other than the center carrier frequency that the system uses, the numerology information may be determined by the offset value between the center carrier frequency and the frequency at which the actual synchronization channel is transmitted. The offset value may be mapped to the sequence of the synchronization signal transmitted to the synchronization channel.

For example, in the system using the center carrier frequency A (e.g., 1.8 GHz), the synchronization signal may be transmitted at the center carrier frequency A using the subcarrier spacing A (e.g., 15 kHz). At this time, the CP length used for the transmission of the synchronization channel may be mapped to the sequence of the synchronization signal or may be mapped to the position of the synchronization signal. For example, if the sequence used for the synchronization signal is a ZC sequence, the synchronization signal is transmitted in CP length A when a root index of the ZC sequence has an A value and the synchronization signal is transmitted in CP Length B when the root index of the ZC sequence has a B value. In this case, the CP Length B may be equal to the CP Length A, or the CP Length B may have a value longer than the CP Length A. Information on whether the CP Length B and the CP Length A use the same value or different values may be embedded in the base station and the terminal. As another example, the CP length is not mapped to the sequence but the terminal may detect it from the synchronization signal in a blind manner.

On the other hand, the bandwidth information used for the transmission of the synchronization channel may vary according to the subcarrier spacing or may be the same regardless of the subcarrier spacing. For example, a system using 15 kHz at subcarrier spacings and a system using 30 kHz may use a 1.4 MHz bandwidth for the synchronous channel transmission. In this case, the system using 15 kHz and the system using 30 kHz uses different number of subcarriers for the synchronization channel transmission. That is, in the system using 15 kHz, 72 subcarriers and 128 FFT are used in the synchronization channel transmission. In the system using 30 kHz, 36 subcarriers and 64 FFT are used in the synchronization channel transmission. On the other hand, the same number of subcarriers may be used in the synchronization channel transmission (e.g., 72) regardless of the subcarrier spacing. In this case, as the subcarrier spacing is changed, the bandwidth used for the transmission of the synchronization channel may vary. In other words, the bandwidth may be scaled while the number of subcarriers (i.e., the number of tones) used for transmission of the synchronization channel remains the same.

If the numerology information is mapped to the difference (offset value) between the position of the frequency at which the synchronization channel is transmitted or the center carrier frequency and the frequency at which the actual synchronization channel is transmitted, the terminal may acquire the information on one or at least one of the subcarrier spacing, the CP length, the bandwidth of the synchronization channel, and the FFT size (1e-1). The mapping information is a value embedded in the terminal and the base station.

On the other hand, the information on the numerology may be transmitted to the terminal via the system information (MIB, SIB, RMSI or OSI) (1e-2, 1e-3). In this example, the synchronization signal may use all the same subcarrier spacings (e.g., 15 kHz may be equally used in the entire frequency band) regardless of the center carrier frequency of the system or use a specific subcarrier spacing at a specific center carrier frequency (e.g., 15 kHz may be equally used in the center carrier frequency band smaller than 6 GHz but the subcarrier spacing of 60 kHz may be used in the center carrier frequency band larger than 6 GHz). As another example, the center carrier frequency at which the specific subcarrier is used may be fixed. For example, 15 kHz may be used when the center carrier frequency is A, B, and C, 30 kHz may be used when the center carrier frequency is A, D, and E, and 60 kHz may be used when the center carrier frequency is A, F, and G. As another example, the numerology used by the synchronization signal may be configured by the base station regardless of the center carrier frequency that the system uses. That is, the system A and the system B operated at a location where a center carrier frequency is less than 6 GHz may use different numerologies, and the information thereon may be transmitted through the synchronization signal by the method as described above or transmitted to the terminal through system information.

If the numerology information is transmitted to the terminal through the system information (MIB, SIB, RMSI, or OSI), the base station may transmit another numerology information supported by its own cell. For example, the base station may transmit information on numerologies B and C in addition to the information on the numerology A supported by the base station as follows.

```
- Supportable numerology = (numerology A, numerology B, numerology
C) {
numerology A = subcarrier spacing A1, CP length A2, BW = A3,...
numerology B = subcarrier spacing B1, CP length B2, BW = B3,...
numerology C = subcarrier spacing C1, CP length C2, BW = C3,...
}
```

In addition, the base station may also include another numerology information supported by a neighboring cell as well as its own cell. For example, the base station may transmit to the terminal the numerology information on the base station of cell ID 2 together with the numerology information on the base station of cell ID 1 as follows. This is to support the terminal to perform measurements on neighboring cells. That is, in order for the terminal to perform the measurement on the neighboring cell for the purpose of a periodic report or a handover, the numerology of the neighboring cells should also be known in advance. Accordingly, the base station may notify the terminal of the numerology information supported by the neighboring cells, thereby enabling the terminal to know which of the numerologies is used to perform the measurement on the cell.

```
- Neighboring cell ID = (1, 18, 24, 109, 234, 310) {
numerology set for cell ID 1 = (numerology A, numerology B, numerol-
ogy
C) {
numerology A = subcarrier spacing A1, CP length A2, BW = A3,...
numerology B = subcarrier spacing B1, CP length B2, BW = B3,...
numerology C = subcarrier spacing C1, CP length C2, BW = C3,...
}
numerology set for cell ID 2 = (numerology A, numerology C, numerol-
ogy
D) {
numerology A = subcarrier spacing A1, CP length A2, BW = A3,...
numerology C = subcarrier spacing C1, CP length C2, BW = C3,...
numerology D = subcarrier spacing D1, CP length D2, BW = D3,...
}
}
```

The numerology information of the neighboring cells may be transmitted cell-specifically through the SIB (or RMSI, OSI) or may be transmitted to a specific terminal through UE-specific RRC signaling.

Meanwhile, in the conventional 4G communication system, a system frame number (SFN) of 10 bits is transmitted through the master information block (MIB). The SFN may have a value from 0 to 1023, and the role of the SFN is for allowing the terminal to match frame synchronization with the base station. For example, if the base station sets the SFN of the MIB to be 124, the frame number of the system has a repeated value in order of 0, 1, 2, . . . , 122, 123, 124, 0, 1, 2, . . . , 122, 123 . . . . Each system frame consists of 10 subframes in units of 10 ms. Therefore, in this example, if SFN=124, the actual subframe exists as 1240 (1240 ms) within one system frame.

In the current LTE, the MIB is transmitted to the physical broadcasting channel (PBCH), and the PBCH is transmitted every 10 ms. In this case, the MIB information transmitted to the PBCH is updated every 40 ms, and the same MIB is transmitted within 40 ms (i.e., the same MIB is transmitted 4 times at 40 ms, and the terminal may combine them). On the other hand, the PBCH is transmitted in the 0-th subframe within a radio frame having a length of 10 ms radio consisting of 10 subframes.

On the other hand, if the numerology is changed according to the above-mentioned various cases, the length of the subframe may be changed. In this case, there may be two methods to determine the transmission time of the MIB.

First, a method of determining the transmission time of the MIB using a fixed time may be considered. In present embodiment, the transmission cycle of the PBCH uses a fixed time (T1 ms). Even the transmission cycle of the MIB also uses a fixed time (T2 ms). This method is the same as LTE, and is operated independently of the numerology. For example, it is assumed that T1=10 ms and T2=40 ms. It is assumed that the numerology information acquired by the terminal A through the synchronization signal of the cell A is subcarrier spacing=30 kHz and the numerology information acquired by the terminal B through the synchronization signal of the cell B is subcarrier spacing=60 kHz. Since the transmission cycle of the PBCH transmitted from each cell is fixed to be T1 ms and the transmission cycle of the MIB is fixed to be T2 ms, each mobile station can receive the MIB by receiving the PBCH in the corresponding cycle.

Next, a method of determining the transmission time of the MIB using a fixed number of subframes (or a fixed number of slots) may also be considered. In present embodiment, the transmission cycle of the PBCH uses the fixed number of subframes (or the fixed number of slots) (N1). The transmission cycle of the MIB also uses the fixed number of subframes (N2). This method may be operated to make the transmission time of the PBCH different according to the numerology of PBCH transmission time. For example, assume that N1=10 and N2=40. If the numerology information acquired by the terminal A through the synchronization signal of the cell A is subcarrier spacing=30 kHz, the cell A may a length of 1 subframe as 0.5 ms. If the numerology information acquired by the terminal B through the synchronization signal of the cell B is subcarrier spacing=60 kHz, the cell B may a length of 1 subframe as 0.25 ms. Therefore, the terminal of the cell A can determine that the PBCH is transmitted at a cycle of 5 ms (0.5 ms×N1) in the A cell and that the MIB is transmitted at a cycle of 20 ms (0.5 ms×N2). In addition, the terminal of the cell B may determine that the PBCH is transmitted at a cycle of 2.5 ms (0.25 ms×N1) in the B cell and that the MIB is transmitted at a cycle of 10 ms (0.5 ms×N2).

On the other hand, the numerology information may be transmitted through a UE-dedicated DL control channel (1e-4). That is, the base station may notify the numerology of the subframe that the terminal should use through the UE-dedicated DL control channel (e.g., PDCCH). For example, if the terminal A supports the URLLC and the terminal B supports the eMBB, the control information of the URLLC received by the terminal A and the subcarrier spacing information (for example, 30 kHz) that the data information uses may be transmitted through the PDCCH. At this time, it may be assumed that the number of symbols used for the URLLC data transmission is previously promised (for example, 7). That is, the base station may notify the terminal of '00=15 kHz', '10=30 kHz', and '11=60 kHz' through 2 bits on the PDCCH. The terminal receiving the indication of 30 kHz ('10') decodes the URLLC data symbol based on the information (7 symbols). At this time, the URLLC terminal needs to perform PDCCH decoding to acquire the resource allocation information of data and the numerology information used for data. For this purpose, the numerology information used in the PDCCH needs to be known. Therefore, the numerology used for the PDCCH decoding may be the numerology information acquired from the synchronization signal or the information acquired through the SIB or MIB.

Figure 1F:
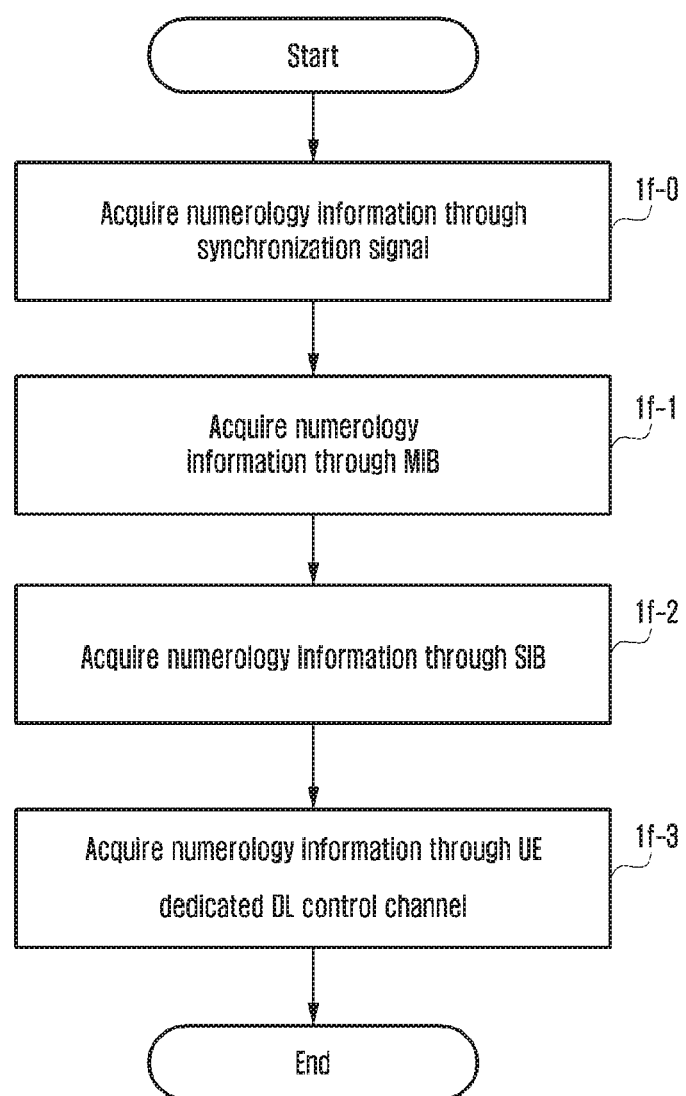
FIG. 1F illustrates an operation of a terminal for a numerology information reception according to an embodiment of the disclosure.

FIG. 1F illustrates an operation of a terminal for a numerology information reception according to an embodiment of the disclosure. More specifically, FIG. 1F illustrates the operation of the terminal when the information on numerology is transmitted through the system information. The base station transmits information on additional numerology different from the numerology used for the synchronization signal by including the information on the additional numerology in the MIB information (1f-1) and the terminal may decode the SIB using the numerology information included in the MIB if the corresponding numerology is the numerology for the SIB. After the SIB decoding, if the SIB information includes information on another numerology (1f-2), the terminal may perform the RACH operation using the numerology information included in the SIB information. If the additional numerology information is not included in the SIB, the terminal may perform the RACH operation using the numerology information included in the MIB. As another example, the base station may transmit the information on the additional numerology different from the numerology used for the synchronization signal by including the information on the additional numerology in the MIB information, and there may be the case in which the corresponding numerology may not be the numerology for the SIB. In this case, the terminal may decode the SIB using the numerology information acquired from the synchronization signal (1f-0). On the other hand, the MIB information may not include the additional numerology information. Even in this case, the terminal uses the numerology used in the synchronization channel for the SIB decoding.

After receiving the MIB, there may be the case where the SIB information includes the information on another numerology (1f-2) and if the corresponding numerology is the numerology related to the RACH operation (for example, the numerology for the RACH preamble transmission). At this time, the terminal may perform the RACH operation using the numerology information included in the SIB information. If the additional numerology information is not included in the SIB, the terminal may perform the RACH operation using the numerology information included in the MIB or the RACH operation using the numerology information acquired from the synchronization signal. Alternatively, the numerology information may also be received from the base station through the UE-dedicated DL control channel (e.g., PDCCH) (1f-3), and the terminal may also perform communication using the numerology information acquired through the PDCCH decoding.

Figure 1G:
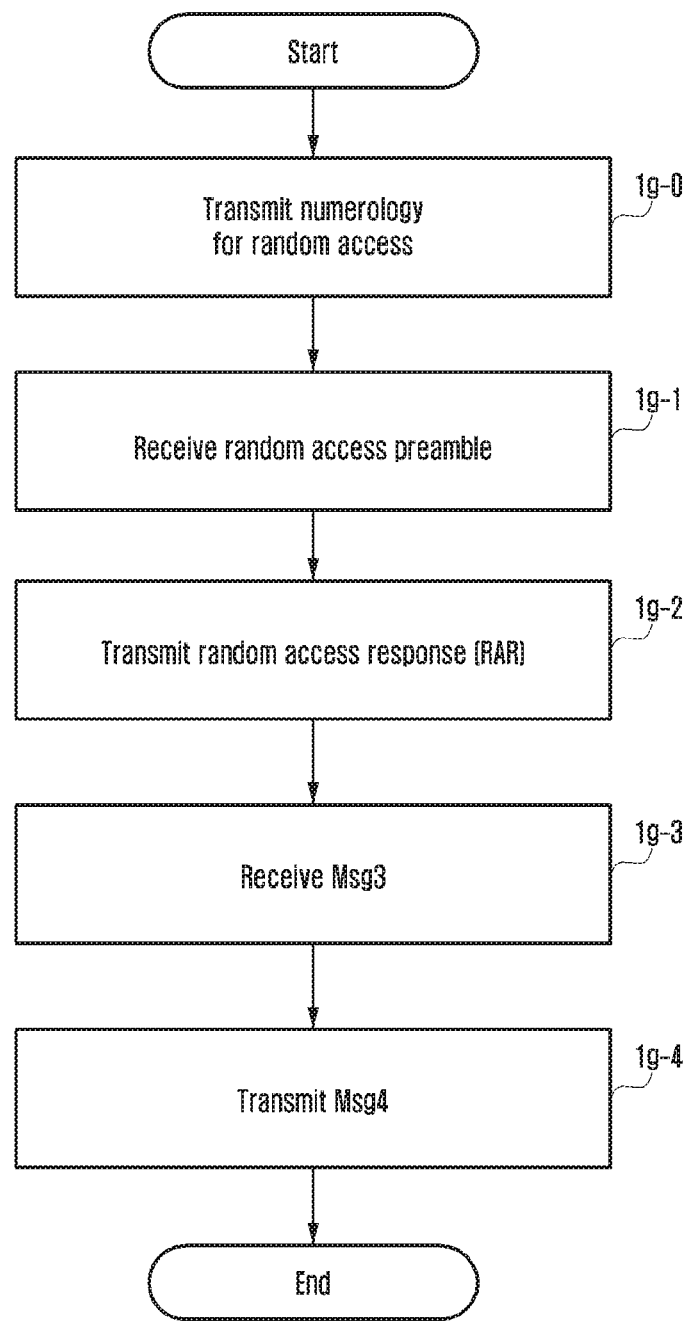
FIG. 1G illustrates an operation of the base station for the numerology information transmission according to an embodiment of the disclosure.
Figure 1H:
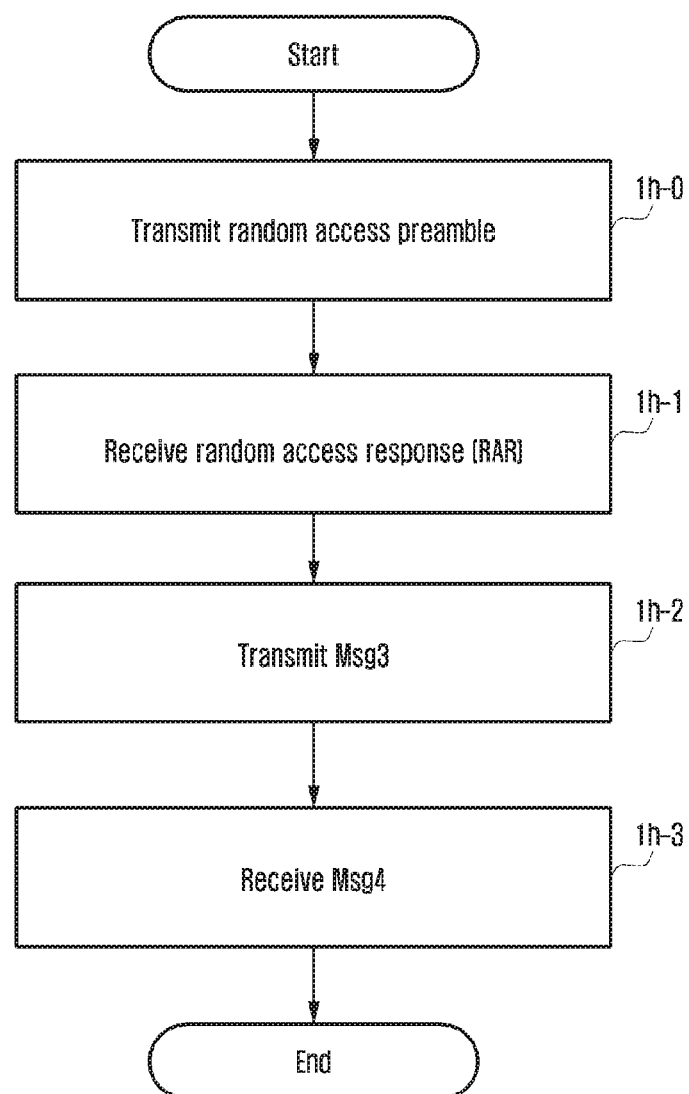
FIG. 1H illustrates an operation of the terminal for the numerology information reception according to an embodiment of the disclosure.

FIG. 1G illustrates an operation of the base station for the numerology information transmission/reception according to an embodiment of the disclosure. The base station may transmit parameters for the random access through the MIB, SIB, RMSI or OSI (1g-0). In this case, the numerology information may be included in the parameters for the random access. If the numerology information is not included in the parameters for the random access, the terminal is operated according to the following procedures 1g-1 to 1g-4, under the assumption that the numerology used in the synchronization signal is used for the random access.

The numerology information for the random access transmitted by the base station may include a subcarrier spacing, a CP length, a random access preamble transmission BW, a RAR reception BW, and the like which are parameters for the random access preamble transmission of the terminal. Meanwhile, as illustrated in FIG. 1E, the terminal that acquires the numerology information using the system information transmitted to the synchronization channel or the broadcasting channel performs the random access procedure. Before the random access procedure is completed, since the uplink synchronization process between the base station and the terminal is not performed, the base station acquires the information on the numerology that the terminal can support. Therefore, the base station may acquire the information on the numerology that the terminal can support or that the terminal prefers (1g-1, 1g-2) through the random access procedure. For example, suppose that terminal A supports the URLLC service. Since it is important that the URLLC service satisfies the delay requirement, it may be necessary to use the subcarrier spacing A1 to satisfy the requirement. At this time, CP length A2 may be used and bandwidth A3 may be used. On the other hand, suppose that the terminal B supports the mMTC service. Since it is important that the mMTC service satisfies the requirement of the transmission distance, to satisfy this, it is possible to use a subcarrier spacing B1 (subcarrier spacing B1<subcarrier spacing A1), support a CP length B2, and use a bandwidth B3.

FIG. 1F illustrates an operation of a terminal for a numerology information reception according to an embodiment of the disclosure. The terminal may receive the parameter information for performing the random access from the base station through the MIB, SIB, RMSI or OSI (1h-0). At this time, the parameter information may include the information on the numerology to be used in the random access. For example, the numerology information (subcarrier spacing, CP length, random access preamble transmission BW, RAR reception BW, etc.) may be included. The terminal may transmit the random access preamble using the numerology information (1h-0). The numerologies used for the RAR reception, the Msg3 transmission, and the Msg4 reception may be the same or different according to on the values that the base station configures (1h-1, 1h-2, 1h-3).

If the MIB or the SIB does not include RACH numerology information for the random access, the terminal transmits the random access preamble using the fixed numerology, receives the RAR using the fixed numerology, and transmits the Msg3 and receives the Msg4 using the fixed numerology to transmit Msg3 and receives Msg4 (1h-0, 1h-1, 1h-2, 1h-3). At this time, the fixed numerology may be the same as or different from the numerology used for the synchronization signal. In the case of different the numerology used in the synchronization signal, a separate mapping rule exists and the base station and the terminal uses a promised value to each other. For example, if the numerology used in the synchronization signal is A, the numerology transmitted to the random access preamble may be A1, the numerology used for the RAR reception may be A2, the numerology used for the Msg3 transmission and the Msg4 reception may each be A3 and A. At this time, A1, A2, A3 and A4 may have different values.

Figure 1I:
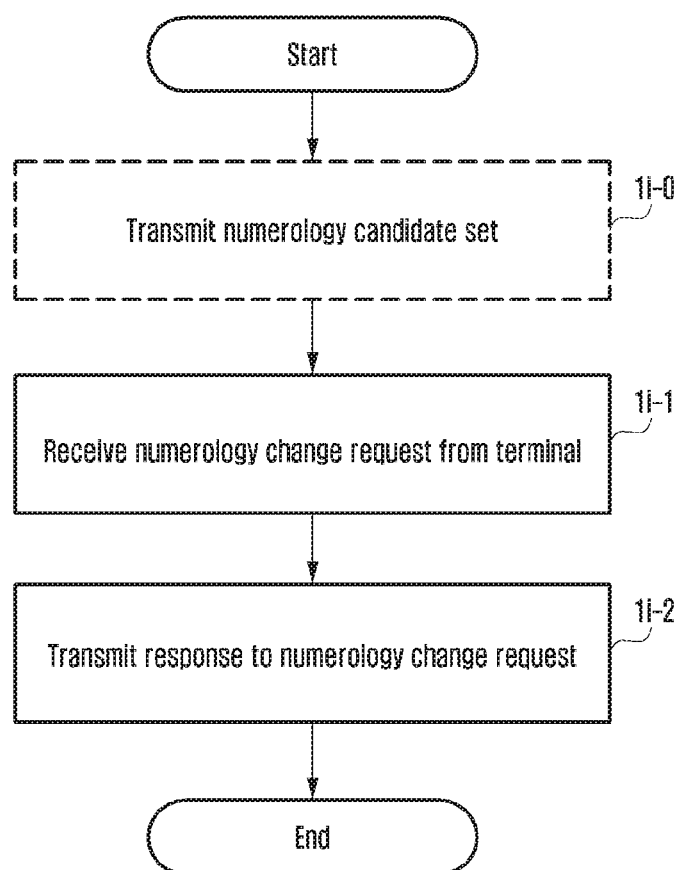
FIG. 1I illustrates an operation of a base station for a numerology information change according to an embodiment of the disclosure.

FIG. 1I illustrates an operation of a base station for a numerology information change according to an embodiment of the disclosure. The base station may transmit numerology candidate set information of the serving base station or base station neighboring to the serving base station to the terminal through the MIB, SIB, RMSI or OSI (1i-0). If the numerology supported by the terminal, the terminal is included in the numerology candidate set transmitted by the base station, the terminal may transmit a numerology change request to the base station (1i-1). The base station receiving the numerology change request may transmit a response to the numerology change request (1i-2). The numerology change request transmitted from the base station to the terminal may be transmitted using the MAC layer information (MAC (control element) CE or MAC Payload) or the upper layer message (RRC) or may be transmitted to the terminal through L1 signaling (e.g., mapped to a downlink control channel or a downlink reference signal).

Figure 1J:
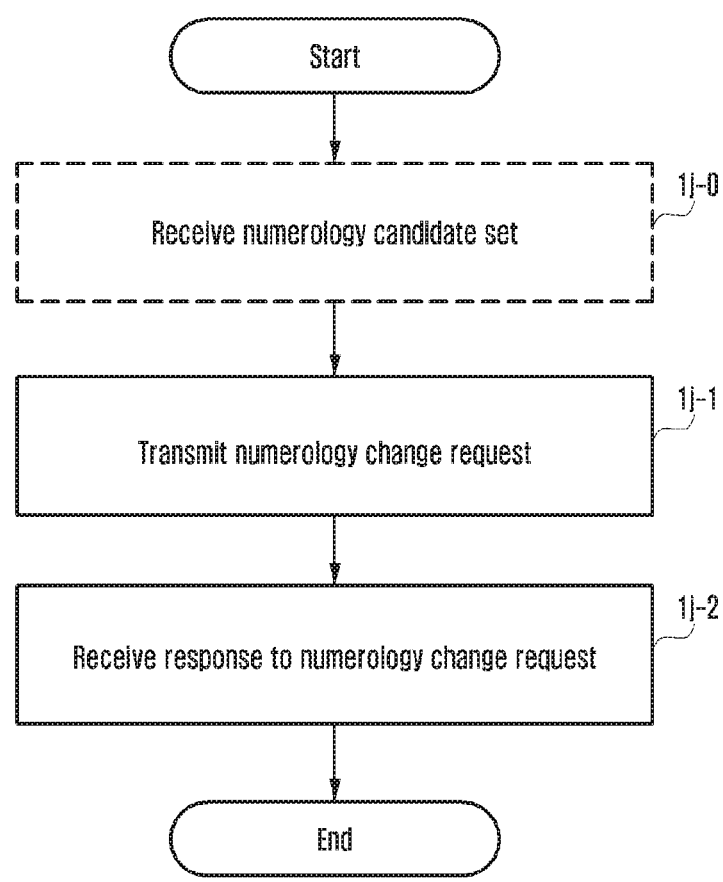
FIG. 1J illustrates an operation of a terminal for a numerology information change according to an embodiment of the disclosure.

FIG. 1J illustrates an operation of a terminal for a numerology information change according to an embodiment of the disclosure. The terminal may receive the numerology candidate set information of the serving base station or base station neighboring to the serving base station to the terminal from the base station through the MIB, SIB, RMSI or OSI (1j-0). If the numerology supported by the terminal, the terminal is included in the numerology candidate set transmitted by the base station, the terminal may transmit a numerology change request to the base station (1j-1). The base station receiving the numerology change request may transmit a response to the numerology change request (1j-2). The request for the numerology change transmitted from the terminal to the base station may be transmitted using the MAC layer information (MAC (control element) CE or MAC Payload) or the upper layer message (RRC) or may be transmitted to the base station through L1 signaling (e.g., mapped to an uplink control channel or uplink reference signal).

Figure 1K:
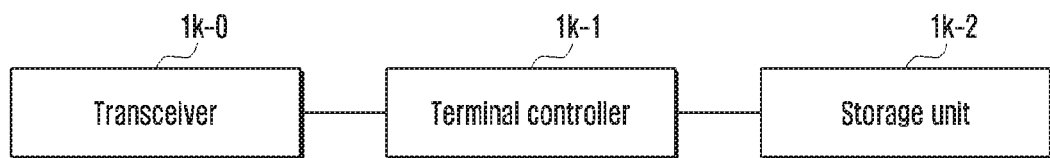
FIG. 1K illustrates a configuration of a terminal according to an embodiment of the disclosure.

FIG. 1K illustrates a structure of a terminal according to an embodiment of the disclosure.

Referring to FIG. 1K, the terminal may include a transceiver 1k-0, a terminal controller 1k-1, and a storage unit 1k-2. In the present disclosure, the terminal controller 1k-1 may be defined as a circuit or an application specific integrated circuit or at least one processor.

The transceiver 1k-0 may transmit/receive a signal to/from other network entities. The transceiver 1k-0 can receive, for example, the synchronization signal, the system information, and the numerology information from the base station.

The terminal controller 1k-1 may control the overall operation of the terminal according to the embodiment of the present disclosure. For example, the terminal controller 1k-1 may control the signal flow between the respective blocks to perform the operations according to the above-described drawings and flowcharts. Specifically, the terminal controller 1k-1 may be operated according to a control signal from the base station, synchronize with the base station, communicate with the base station, receive the numerology information for a specific service, and transmit/receive a message or a signal to and from other terminals and/or the base station.

The storage unit 1k-2 may store at least one of the information transmitted/received through the transceiver 1k-0 and the information generated through the terminal controller 1k-1.

Figure 1L:
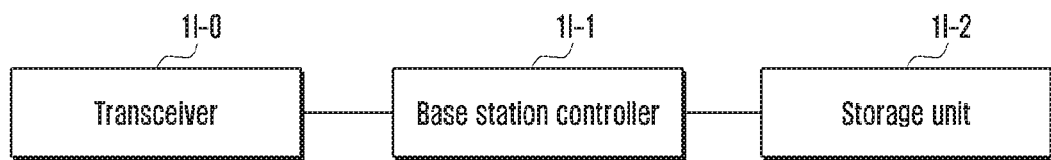
FIG. 1L illustrates a configuration of a base station according to an embodiment of the disclosure.

FIG. 1L illustrates a configuration of a base station according to an embodiment of the disclosure.

Referring to FIG. 1L, the base station may include a transceiver 1l-0, a base station controller 1l-1, and a storage unit 1l-2. In the present disclosure, the base station controller 1l-1 may be defined as a circuit or an application specific integrated circuit or at least one processor.

The transceiver 1l-0 may transmit and receive a signal to and from other network entities. For example, the transceiver 1l-0 may transmit the synchronization signal and the system information to the terminal, and further may transmit the numerology information for a predetermined service.

The base station controller 1l-1 may control the overall operation of the base station according to the embodiment of the present disclosure. For example, the base station controller 1l-1 may control the signal flow between the respective blocks to perform the operations according to the above-described drawings and flowcharts. Specifically, the base station controller 1l-1 may not only transmit the synchronization signal and the system information for providing a service to the terminal, but also transmit the information on the predetermined numerology to the terminal for the communication with the terminal.

The storage unit 1l-2 may store at least one of the information transmitted/received through the transceiver 1l-0 and the information generated through the base station controller 1l-1.

Second Embodiment

Hereinafter, a second embodiment will be described below.

The random access process, that is, the random access channel (RACH) transmission process based on beamforming can be designed in consideration of the following matters.

1. The presence or absence of beam reciprocity (or beam correspondence) should be considered.
2. The RACH sequence length should be reduced for the beam change in the RACH transmission process.
3. Even if the beam is changed during RACH transmission, the multiplexing with data channel should be performed.

Considering these requirements, the RACH procedure according to the proposed embodiments may be designed as follows.

First, we assume that there is the beam reciprocity. The beam reciprocity means that a beam used when a terminal receives a specific signal is used for transmission or the beam used for the transmission may be used for reception. That is, the beam reciprocity (or beam correspondence) means that the transmission beam of the base station (or the reception beam of the terminal) at a specific time point may be used as the reception beam (or the transmission beam of the terminal) of the base station at another time point as it is.

The terminal performs a series of processes of adjusting downlink synchronization with the base station according to the synchronization signal, and then transmits the RACH. At this time, the terminal may select an RACH preamble index according to the RACH configuration included in the system information illustrated in FIG. 2B, set the transmission power, and transmit the RACH signal to the base station. Here, if assuming the beam reciprocity of the terminal, the terminal may transmit the RACH by setting the transmission beam based on the reception beam used for the downlink synchronization. If other words, if there is beam reciprocity (or beam correspondence), the terminal may transmit the RACH signal by setting the reception beam that has received the synchronization signal as the transmission beam. In addition, if assuming the beam reciprocity of the base station, the terminal may assume the reception beam of the base station when the transmission beam of the base station that has transmitted the synchronization signal in the downlink synchronization interval transmits the RACH. Therefore, the terminal may transmit the RACH using the RACH resource corresponding to the beam by which the base station may receive the RACH transmitted from the terminal.

Figure 2A:
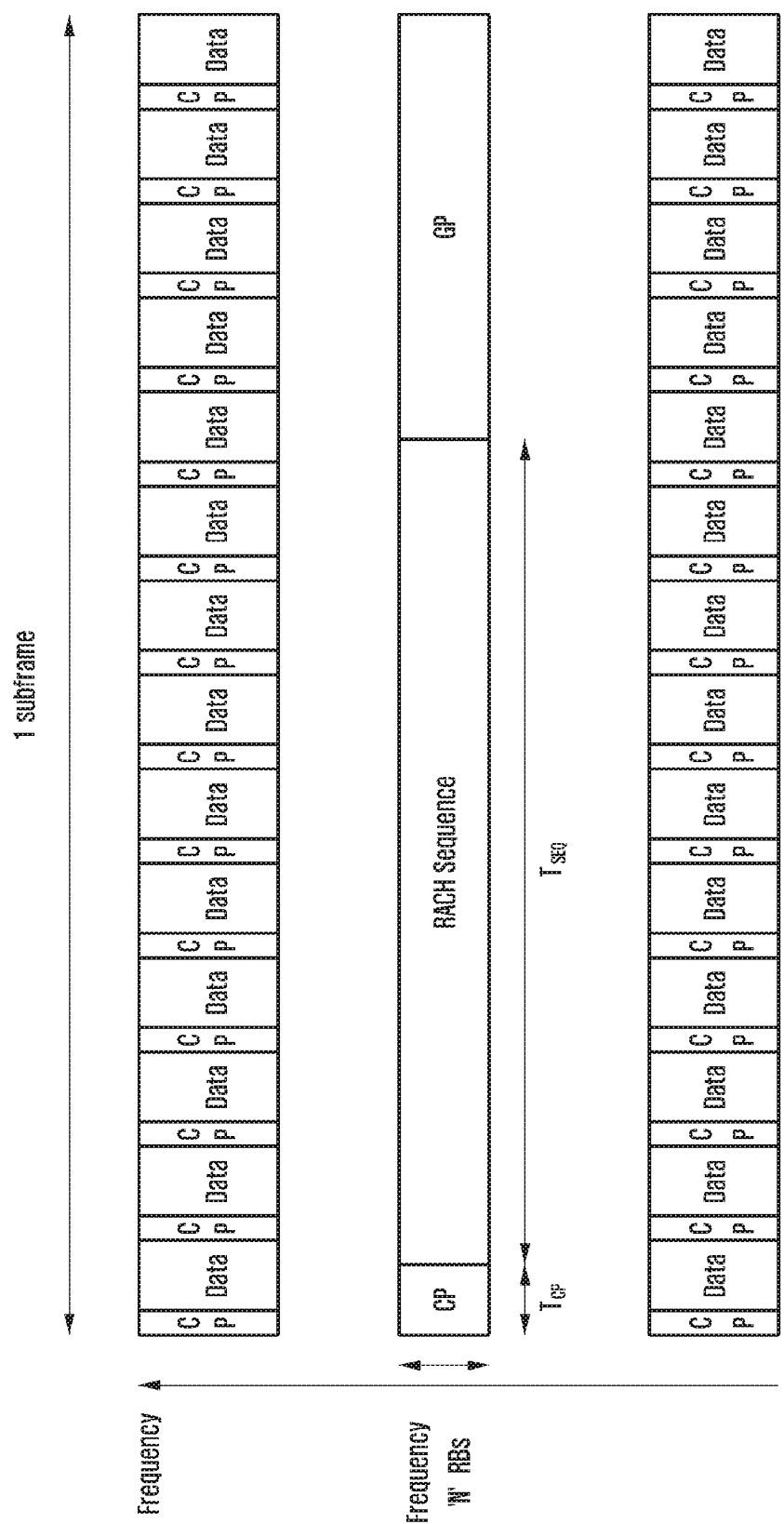
FIG. 2A illustrates an RACH is transmitted in a specific frequency resource and a specific subframe index.

FIG. 2C illustrates the RACH transmission using the RACH resource according to the beam of the base station when the beam reciprocity (or beam correspondence) of the base station is established. In FIG. 2C, if the beam reciprocity (or beam correspondence) is established, a transmission beam 2c-0 that the base station has used to transmit the synchronization signal (or PBCH) is used as the reception beam for receiving the RACH signal from the terminal (2c-1). Similarly, the terminal uses the reception beam 2c-0 used for receiving the synchronization signal (or PBCH) as the transmission beam for transmitting the RACH signal (2c-1). Accordingly, since the terminal knows in advance by which of the reception beams the base station receives the RACH signal, the terminal transmits the RACH signal using the reception beam that has received the synchronization signal as it is. Meanwhile, in order to map the RACH resource to the reception beam of the base station, the transmission beam change order of the base station and the reception beam change order of the base station should be the same. The RACH signal is designed to be longer than a symbol length of a general data channel since a roundtrip delay should be considered. Therefore, the number of RACH signals that can be transmitted in one subframe is smaller than that of downlink signals that can be transmitted in one subframe. In order for the terminal to determine the RACH resource, the total number of beams used by the base station is required. FIG. 2D illustrates a method of notifying the SIB of the total number of beams used by a base station. Referring to FIG. 2D, it can be seen that configuration information (PRACH-ConfigInfo-Withreciprocity) notifying the number of beams of the base station is transmitted to the RACH configuration transmitted to the SIB when assuming the beam reciprocity. Here, the configuration information notifying the number of beams indicates the number of beams operated by the base station based on the number of subframes, and in FIG. 2D, N may be determined according to the operation of the base station.

Figure 2E:
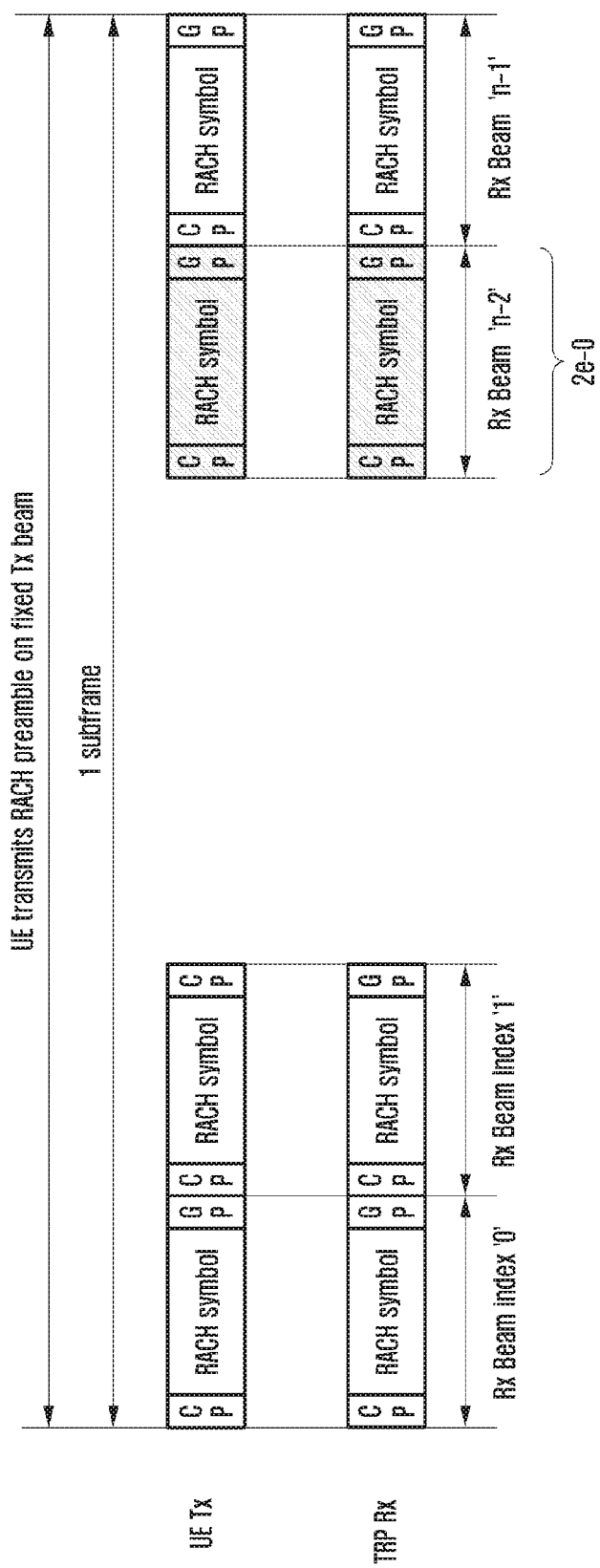
FIG. 2E illustrates an RACH design when the beam reciprocity exists.

FIG. 2E illustrates a design example of an RACH signal when the beam reciprocity exists. As illustrated in FIG. 2E, the terminal may transmit/receive the RACH signal using the RACH resource of an interval 2e-0 thickly indicated. One RACH resource consists of a cyclic prefix (CP), a guard period (GP), and an RACH symbol. The CP may be designed considering a propagation delay and a channel delay. Here, the GP is required for each RACH resource. The reason is that when the terminal transmits the RACH signal using the neighboring resources, the GP is inserted to prevent an inter-subcarrier interference between subcarriers due to different propagation delays.

In addition, the base station may repeatedly receive the RACH using a plurality of RACH resources in order to improve RACH reception performance. For this purpose, a parameter notifying for how many RACH resources the terminal should transmit the RACH signal as illustrated in FIG. 2F may be added to the system information. As illustrated in FIG. 2F, the base station notifies, through a numberOfResources field, information indicating for how many resources the base station should transmit the RACH signal to the terminal. Here, M is an integer greater than 1. The terminal receiving the RACH signal may transmit the RACH signal to the base station repeatedly a predetermined number of times. Alternatively, the RACH preamble format may also be defined differently depending on how many times the RACH signal is repeated. The base station may inform the terminal of the predetermined RACH format through the SIB.

Next, assume that there is no beam reciprocity (or beam correspondence). In this case, the terminal may not estimate the RACH resource corresponding to the reception beam of the base station as in the case in which there is the beam reciprocity. Therefore, the terminal continuously transmits the RACH signal within one subframe (or a predetermined time interval). At this time, since the base station may not know by which reception beam the RACH signal of the terminal is received, the base station may receive the RACH signal while changing the reception beam within the time interval. FIG. 2G illustrates the RACH transmission process when the beam reciprocity of the base station is not established. As illustrated in FIG. 2G, even if the terminal estimates the most suitable transmission beam of the base station in the downlink signal reception process (2g-0), since it may not be assumed that the beam may be used as the RACH signal reception beam of the base station, the base station continuously transmits the RACH signal within a time interval (2g-3) to receive the RACH signal while changing the reception beam (2g-1, 2g-2). For example, as illustrated in FIG. 2G, the terminal repeatedly transmits an n-th RACH signal using a predetermined transmission beam (2g-1), and then repeatedly transmits an n+1-th RACH signal using the next transmission beam (2g-2). The base station receives the RACH signal while changing the reception beam over the time interval two times.

Since the terminal does not have information on the number of beams of the base station and how many beams are used in one subframe, this information needs to be transmitted to the terminal with included in the SIB. FIG. 2H illustrates a RACH configuration information (prach-ConfigInfo_Withoutreciprocity) including information on a beam operation of the base station in the absence of beam reciprocity (or beam correspondence). As illustrated in FIG. 2H, the base station may notify the RACH configuration information of the system information about how many reception beams the base station operates or notify for how many subframe (or time interval) the terminal transmits the RACH by the fixed beam.

FIG. 2I illustrates the RACH configuration information in the case where the beam operation of the base station is performed in units of subframes. According to the embodiment of FIG. 2I, since the beam of the terminal is changed in units of subframes, the beam operation of the base station may not be efficient compared to the method illustrated in FIG. 2H but the amount of information included in the SIB may be reduced.

Figure 2J:
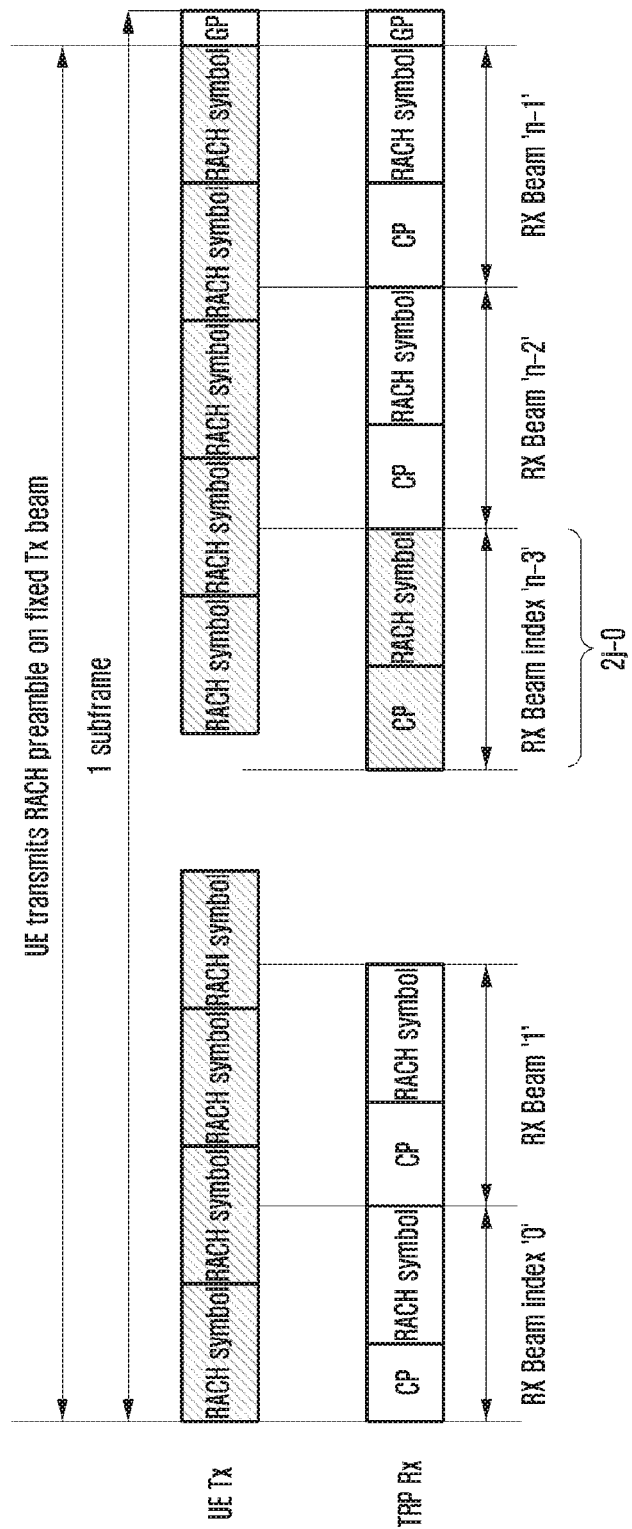
FIG. 2J illustrates an RACH design when the beam reciprocity does not exist.

FIG. 2J illustrates a design example of an RACH signal when the beam reciprocity does not exist. As illustrated in FIG. 2J, the terminal may transmit/receive the RACH signal using the RACH resource of an interval 2j-0 thickly indicated. In the embodiment of FIG. 2J, unlike FIG. 2E, the RACH resource that the terminal transmits does not include the CP and the GP but only transmits the RACH symbol. On the other hand, the base station changes the reception beam with the concept of CP and receives the RACH signal. In this case, since the RACH signal is repeatedly received, the previously received RACH symbol serves as a CP of the RACH symbol consecutively received. In this way, the design of the RACH signal may vary according to the beam reciprocity of the base station.

Figure 2K:
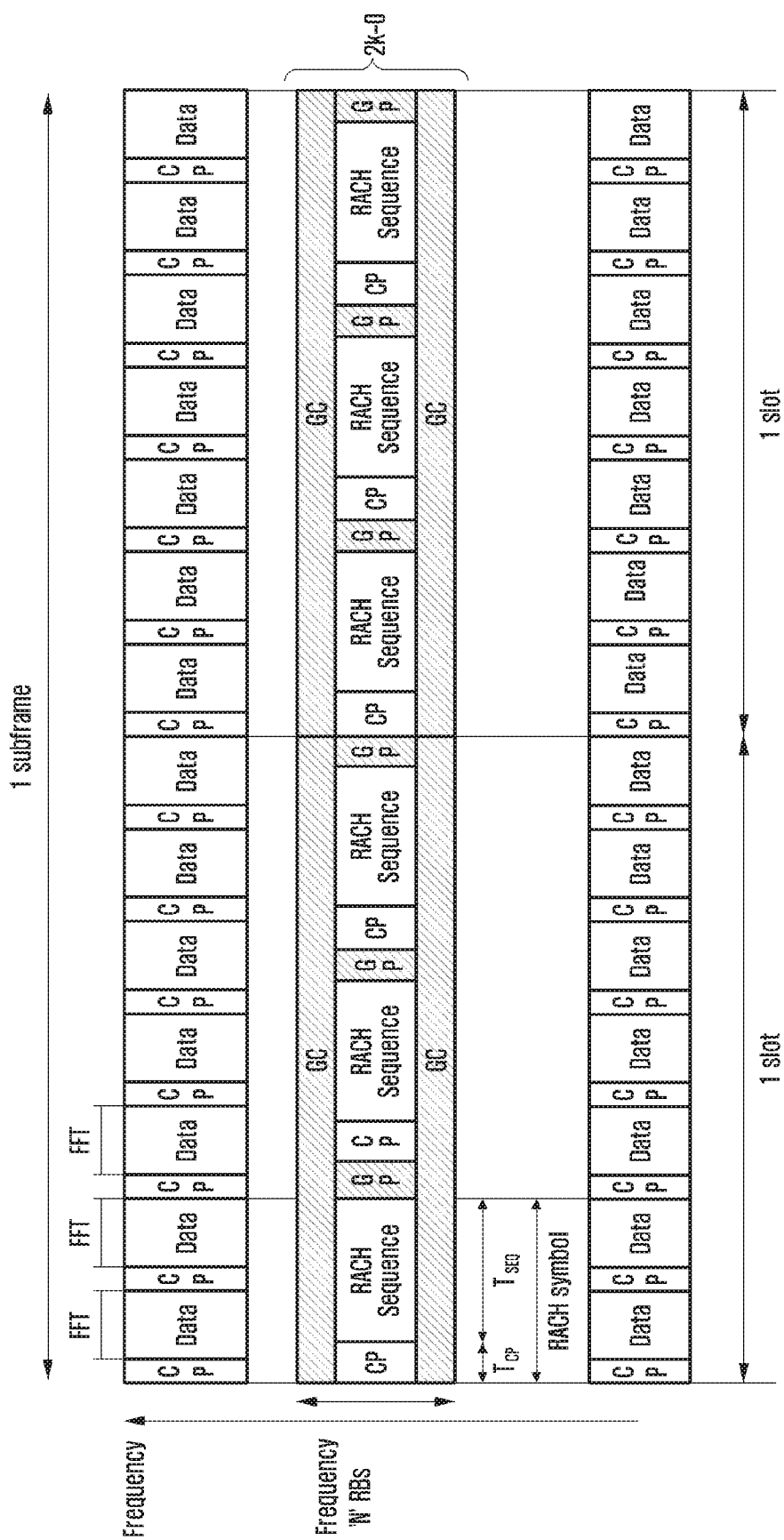
FIG. 2K illustrates a case where a data channel and a subcarrier spacing of the RACH are different.

FIG. 2K illustrates a case where a data channel and a subcarrier spacing of the RACH are different. Referring to FIG. 2K, the base station may receive the RACH resource while changing the beam for the RACH reception (2k-0). Here, in order to receive the RACH, the base station may filter RBs having N frequencies to receive only the RACH and then estimate the RACH while changing the beam (2k-0), as in the conventional LTE method. However, since it is very difficult to use pass-band filtering to receive the data channel, the FFT is performed by the length of the data symbol. In this case, even if the data symbol and the RACH are allocated at different positions in the frequency domain, the orthogonality between the two channels is not established, resulting in the inter carrier interference (ICI). Therefore, a guard subcarrier is required to reduce the ICI.

Figure 2L:
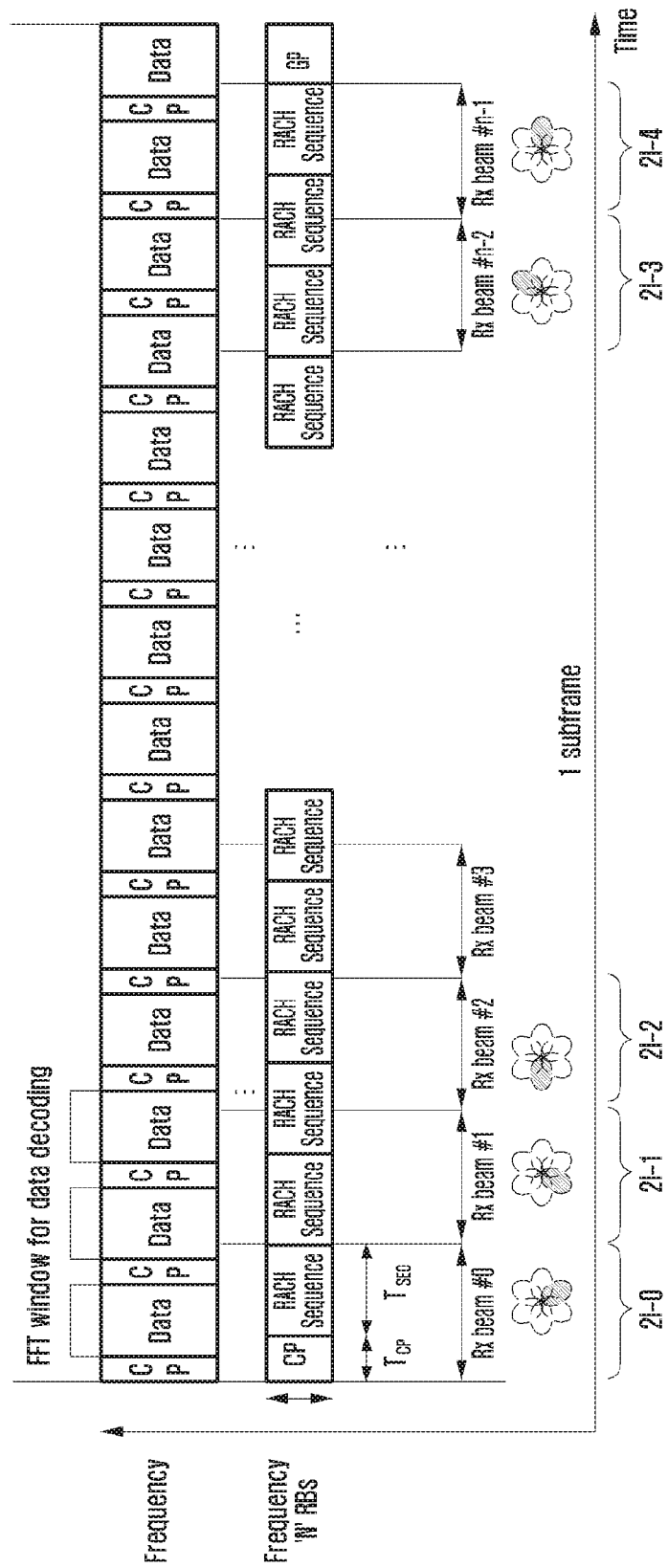
FIG. 2L illustrates a case where the data channel and the subcarrier spacing of the RACH are the same.

FIG. 2L illustrates a case where the data channel and the subcarrier spacing of the RACH are the same. The RACH reception and data decoding process in FIG. 2L is similar to or similar to the process described in FIG. 2K. However, in the case of FIG. 2L, since the orthogonality of the RACH channel is maintained even if the data symbol is subjected to the FFT, the ICI does not occur. Therefore, it is advantageous to set the subcarrier spacing of the RACH based on the beamforming to be the same as the subcarrier spacing of the data channel. According to the embodiment, the base station may receive the RACH signal transmitted from the terminal while changing the reception beam (2*l*-0, 2*l*-1, 2*l*-2, . . . , 2*l*-3, 2*l*-4).

Hereinafter, the embodiments in which the base station notifies the terminal of the information on the beam reciprocity (or beam correspondence) described above will be described. The base station may transmit a 1-bit signal notifying whether the beam reciprocity of the base station is established as illustrated in FIG. 2M by adding the 1-bit signal to the SIB. Alternatively, the base station may inform the terminal of the information indicating whether the beam reciprocity is established through the RACH configuration transmission.

When the beam reciprocity is established according to the embodiment illustrated in FIG. 2M, the base station may transmit the configuration information for beam reciprocity to the terminal as illustrated in FIG. 2N. On the other hand, when the beam reciprocity is not established according to the embodiment illustrated in FIG. 2M, the base station may transmit the configuration information for the case in which the beam reciprocity is not established to the terminal as illustrated in FIG. 2O.

Meanwhile, according to the embodiment illustrated in FIG. 2M, the terminal may transmit the RACH signal to the base station by setting the RACH configuration differently through the information notifying whether the beam reciprocity of the base station included in the SIB is established. A 1 bit indicator (ParameterInfo in FIG. 2P) that notifies the terminal of the beam reciprocity is included in the PRACH ConfigInfo to be able to indicate parameters depending on two configurations, respectively. FIG. 2P is a diagram illustrating a method in which the above-mentioned 1-bit indicator (ParameterInfo) is included in the PRACH configinfo to indicate two configurations (configuration information when ParameterInfo=0 or configuration information when ParameterInfo=1), respectively.

Also, the terminal may also know the beam reciprocity using an implicit method other than the explicit method using the 1-bit indicator described above. That is, the RACH configuration described above may have different lengths depending on whether the beam reciprocity of the base station is established. In this case, the terminal may assume two SIB lengths (N1, N2), where N1 may indicate the SIB length when beam reciprocity is assumed, and N2 may mean the SIB length when the beam reciprocity is not established. At this time, the terminal may perform the blind detect on the SIB lengths corresponding to the lengths of N1 and N2, respectively. The terminal knows the RACH configuration according to the length of the N1 or N2 that succeeds in the decoding and may transmit the corresponding RACH signal to the base station according to the embodiment described in FIG. 2E (assumption of the beam reciprocity) or FIG. 2J (no assumption of the beam reciprocity).

As another embodiment, the base station may transmit the beam reciprocity of the base station to the terminal through the downlink synchronization signal. That is, if the number of sequence sets of the downlink synchronization signal is defined as Q, the sequence of Q/2 is allocated as the sequence when assuming beam reciprocity, and the remaining Q/2 sequences may be transmitted to the terminal by being allocating as the sequence when not assuming the beam reciprocity. That is, from which sequence set the sequence is set may mapped to the beam reciprocity (or beam correspondence) to generate the synchronization signal. In this case, the complexity when the terminal performs the downlink synchronization is doubled, but there is an advantage in that the overhead for inserting the 1-bit indicator or the blind detection depending on the length of the SIB is not performed.

Figure 2Q:
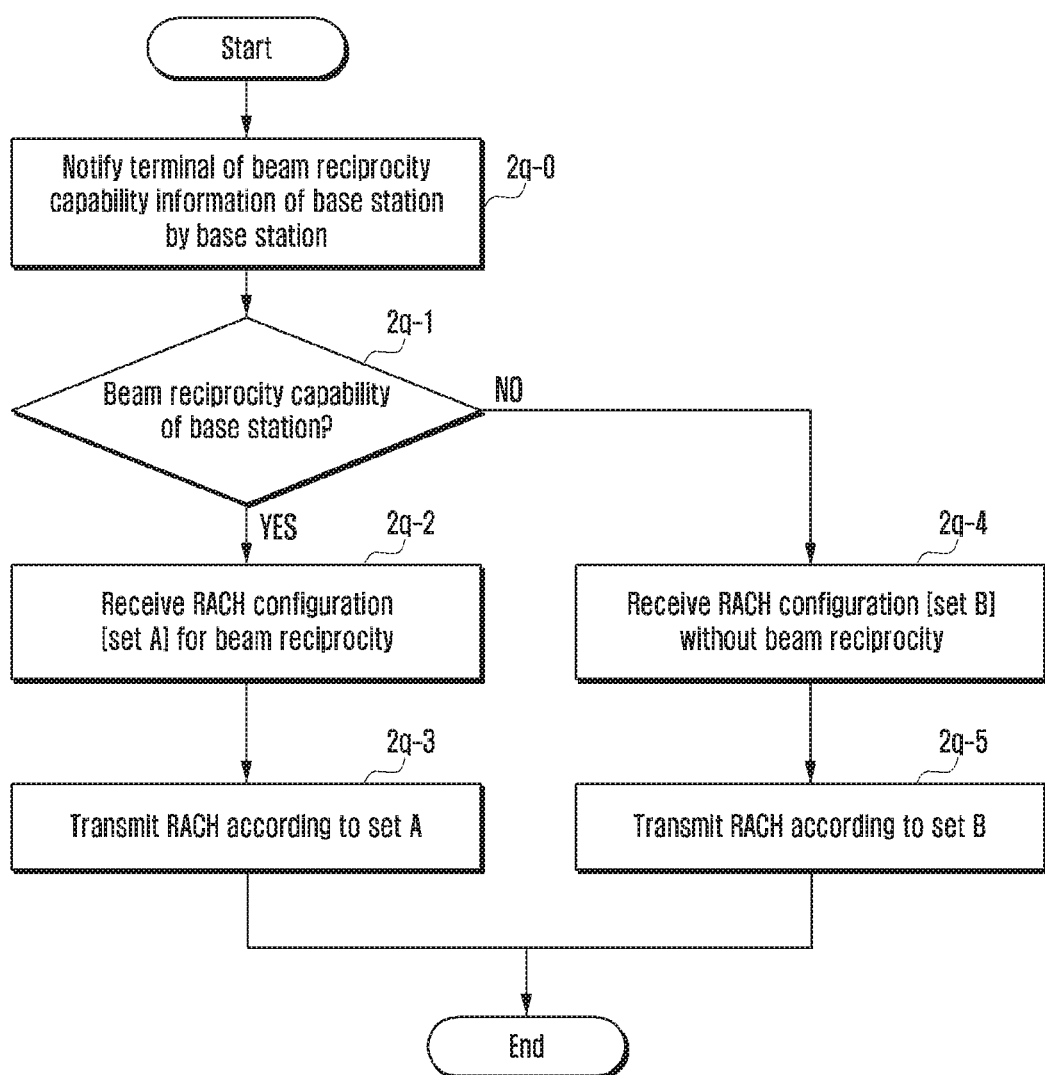
FIG. 2Q illustrates an operation of the RACH transmission of the terminal according to the beam reciprocity of the base station.

FIG. 2Q illustrates an operation of the terminal for the above-described process. In step 2*q*-0 of FIG. 2Q, the terminal determines beam reciprocity capability of the base station. The process may apply at least one of the explicit method for notifying, by a base station, beam reciprocity using a 1-bit indicator and the implicit method for performing, by a terminal, a blind detection on different SIB lengths or determining beam reciprocity using a sequence of a synchronization channel. The terminal determines the beam reciprocity of the base station, and if there is the beam reciprocity (or beam correspondence), receives an RACH configuration set A (2*q*-2) or if there is no beam reciprocity (or beam correspondence), may receive an RACH configurations set B. If receiving Set A (2*q*-2), the terminal transmits the RACH signal as illustrated in FIG. 2E. At this time, the power consumption of the terminal may be minimized (2*q*-3). If receiving Set B (2*q*-4), the terminal transmits a RACH signal as illustrated in FIG. 2J. At this time, the terminal continuously transmits the RACH symbol instead of the GP so as to perform as much beam sweeping as possible (2*q*-5). In this case, the base station may inform the terminal of how many RACH subframes the terminal should transmit using the fixed transmission beam through the RACH configuration.

In the above-described embodiment, the method of explicitly or implicitly notifying, by a terminal, beam reciprocity (or the beam correspondence) is describe, but the present disclosure is not limited these embodiments. That is, the base station may notify the terminal of a predetermined RACH preamble format A or RACH preamble format B without notifying beam reciprocity (beam correspondence). The RACH preamble format A or B may be information indicating by which of the numerology the terminal transmits the RACH. The terminal may transmit the RACH signal according to the received RACH preamble format regardless of whether the terminal knows the beam reciprocity (beam correspondence) of the base station. At this time, if assuming that the plurality of RACH formats are transmitted, the RACH format A and RACH format B may be operated as illustrated in FIG. 2R.

Figure 2R:
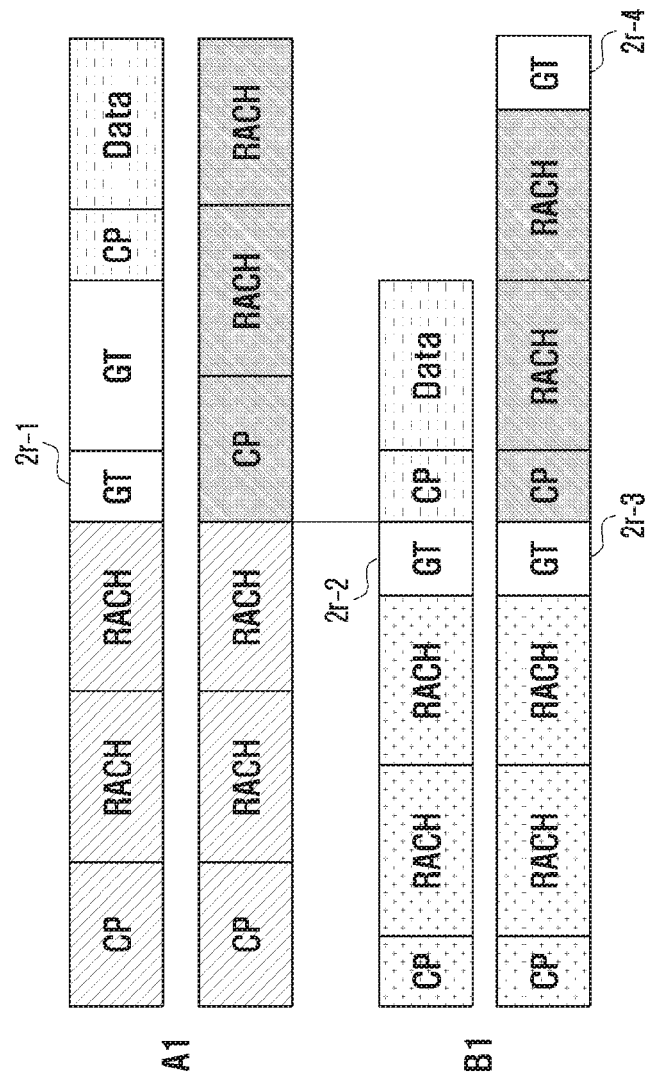
FIG. 2R illustrates an RACH operation method when considering one or a plurality of RACH formats.

FIG. 2R illustrates an RACH operation method when considering one or a plurality of RACH formats.

In the example illustrated in FIG. 2R, the RACH format A is a format when the beam reciprocity (beam correspondence) is established, and the RACH format B is a format when the beam reciprocity (beam correspondence) is not established. The format A may mean a format in which GT is not required between the RACH formats because the terminal selects a specific resource to transmit the RACH. That is, the GT is not required between the RACH formats A before the terminal transmits or receives the data channel, and the GT is required to prevent the inter symbol interference before transmitting or receiving the data channel (2r-1). Since the format B does not consider the beam reciprocity (beam correspondence), the GT is required between the RACH formats B regardless of the data channel (2r-2, 2r-3, 2r-4).

Figure 2S:
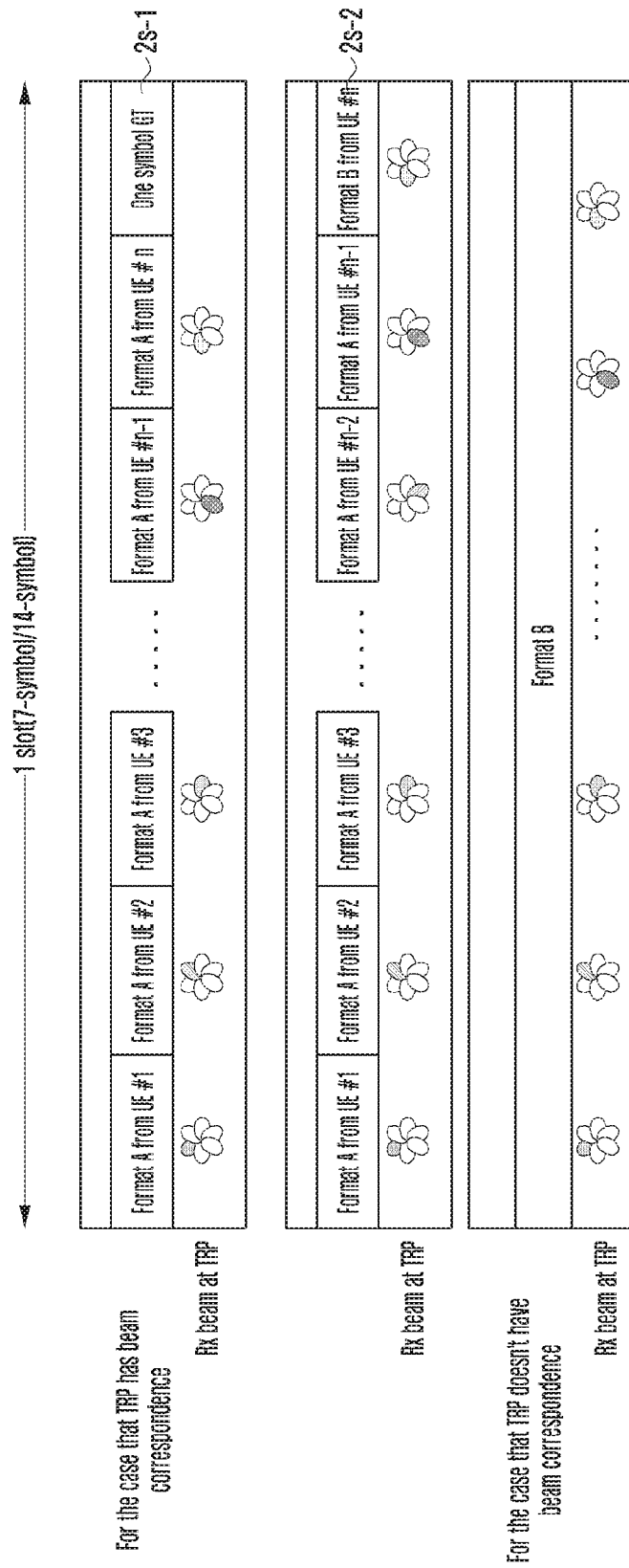
FIG. 2S illustrates a case where a plurality of RACH formats A and RACH formats B are transmitted in one slot

In view of such an operation, a plurality of RACH formats can be represented as illustrated in FIG. 2S. FIG. 2S illustrates a case where a plurality of RACH formats A and RACH formats B are transmitted in one slot.

In case of applying only the format A only as in FIG. 2S, since there is no GT, the last symbol is used as GT (2s-1). When only the format B is applied, the GT is inserted between RACH formats as illustrated in FIG. 2R, which causes the interference in the data decoding when the data and the RACH are FDM. Therefore, the format B may be allocated to the end of the RACH format (2s-2). That is, if the format B is allocated, only the format B is used in a slot (case illustrated at the bottom of FIG. 2S), or the format B is positioned at the end of the slot as illustrated in the middle of FIG. 2s (2u-2).

According to another embodiment of the present disclosure, the present disclosure described below may be applied.

A length of the above-described RACH preamble format may be very long according to the repeating (or, iterative) transmission frequency. That is, the length may be extended to the preamble length of (N×M) times according to M depending on the repeating transmission N and the number of Rx beams of the base station for the reliable transmission. In this case, the downlink scheduling constraints of the base station occurs because the uplink resource needs to be reserved for a long time. Therefore, the base station should notify the terminal in IDLE mode/CONNECTED of the number of Tx occasions of the terminal through the RACH configuration or the MIB. The Tx occasion means the transmission of the RACH preamble format of the terminal and otherwise may be referred to as RACH Burst. The terminal transmits the RACH preamble format during the Tx occasion according to the request of the base station and may fix or change the transmission beam of the terminal during several Tx occasions. The base station may ideally change and receive a total of N receive beams during each Tx occasion, and needs to notify the terminal of M repeating transmissions to receive beams of a total of (N×M) times.

Figure 2T:
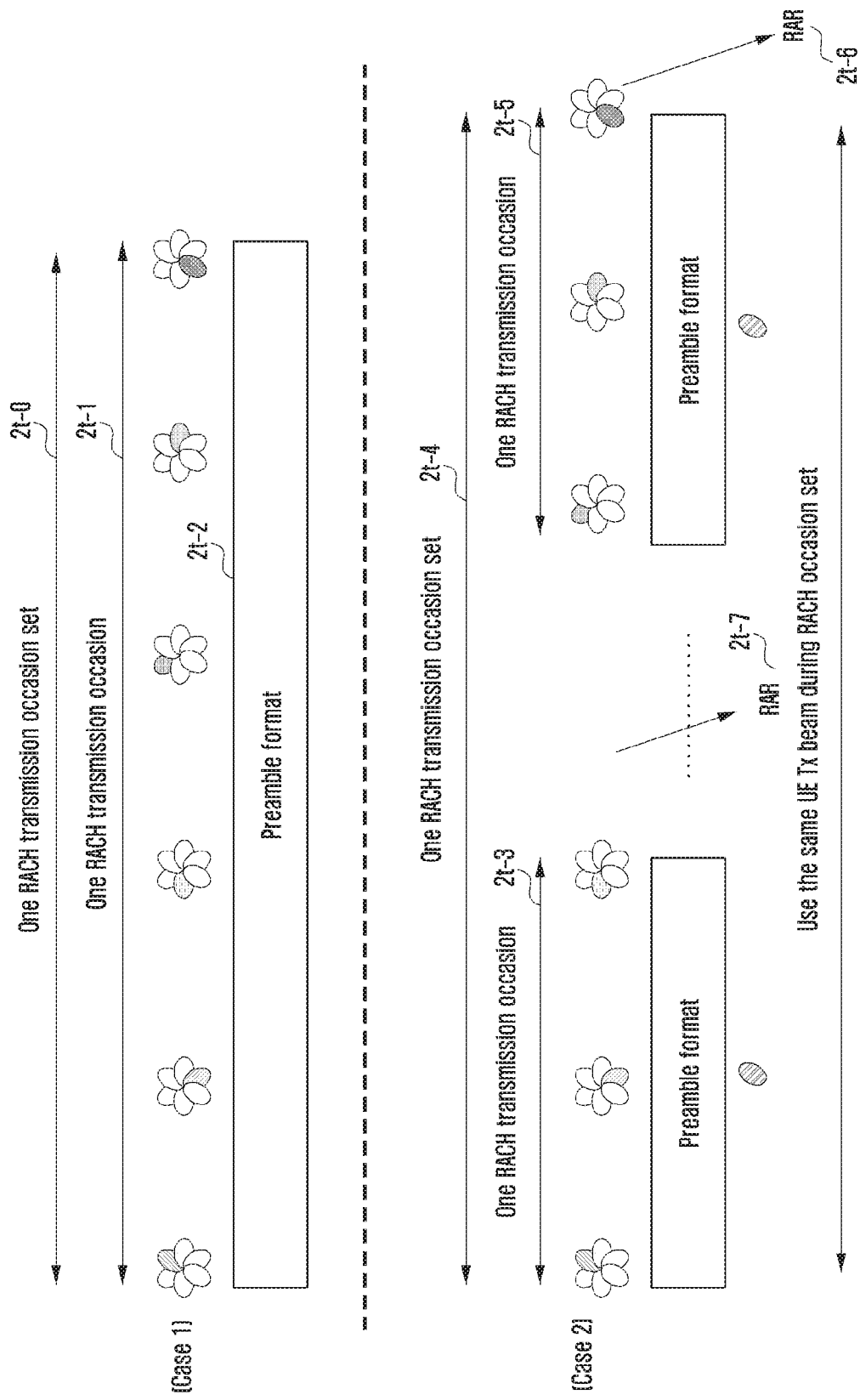
FIG. 2T illustrates a method for supporting various Tx occasions.

FIG. 2T illustrates the operations of the terminal and the base station according to the Tx occasion. Case 1 illustrated at the upper part of FIG. 2T shows a case where one Tx occasion (2t-1) is considered in the Tx occasion set (2t-0). Here, it can be seen that the length of the preamble format becomes very long according to the number of beams of the base station (2t-2). Therefore, the DL scheduling constraint of the base station occurs.

Meanwhile, in Case 2 illustrated in the lower part of FIG. 2T, in order to alleviate the constraint, the base station notifies the terminal of the Tx occasions of a total of M times within the Tx occasion set (2t-4), and thus the terminal may be allocated the Tx occasion a total of M times. Here, the terminal can transmit the transmission beam while fixing or changing the transmission beam of the terminal during the Tx occasion of a total of M times. The RAR (MSG2) may be transmitted every Tx occasion (2t-7) or may be transmitted after the Tx occasion of a total of M times (2t-6). If the base station transmits the RAR notifying fail following the Tx occasion interval in which the terminal fixes the transmission beam and transmits the RACH, the terminal changes the transmission beam and may transmit the RACH signal in the next Tx occasion interval.

The length of the preamble format described above may be determined according to the configuration of the base station, that is, it is determined by being allocated the iteration of N times and the Tx occasion of M times. Specifically, the length of the RACH preamble format may be determined as follows.

Figure 2U:
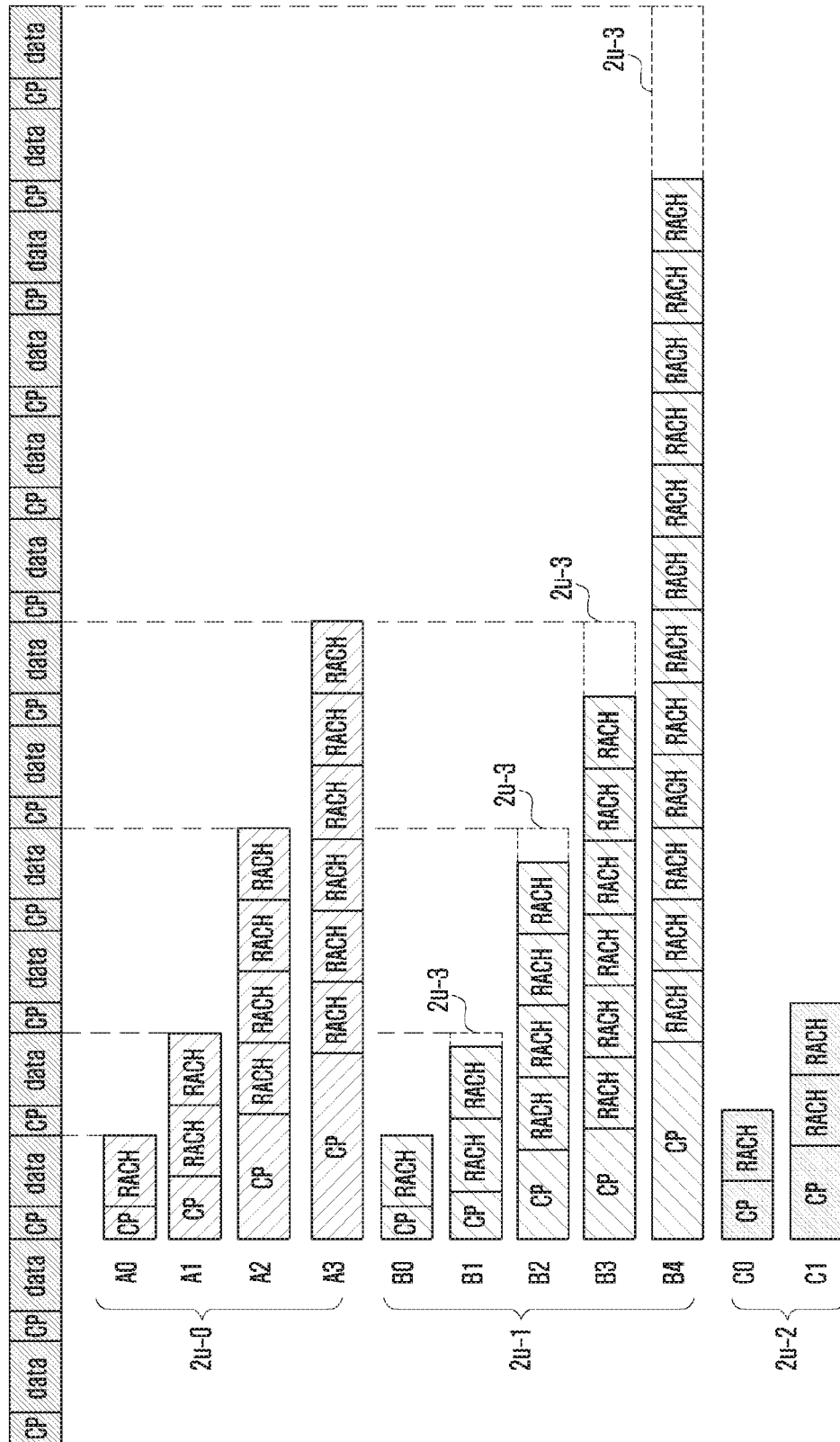
FIG. 2U illustrates a structure of an RACH preamble format according to an embodiment of the disclosure.

1. Preamble format is that CP+(preamble length (seq) *N)+GT length is repeated M times
2. It may be made in the form of PCP+(seq*N*M)+GT Alternatively, similar to the table on the preamble format defined in the LTE, the length of the RACH preamble format may be defined in the form of the table. That is, the repeating number on N may be previously defined in Table. The table illustrated in FIG. 2V illustrates an example of the table defining the parameters associated with the RACH preamble format. In FIG. 2V, the preamble format A represents a preamble format (2v-0) when there is the beam reciprocity (beam correspondence), and the preamble format B represents the preamble format (2v-1) when there is no beam reciprocity. FIG. 2U is a diagram illustrating an example of the RACH preamble format structure according to the parameters illustrated in FIG. 2V. According to the proposed embodiments, the RACH preamble format is defined using the same numerology as the data channel, and the numerology for the RACH preamble format may be transmitted to the terminal through the SIB, the remaining minimum system information (RMSI), and/or the other system information (OSI) for transmitting the system information. In FIG. 2U, 2u-0 and 2u-1 each correspond to parameters 2v-0 and 2v-1 defined in FIG. 2V. Furthermore, a vacant space 2u-3 in the 2u-1 showing the case where there is no beam reciprocity (beam correspondence) may mean the GP.

Figure 2W:
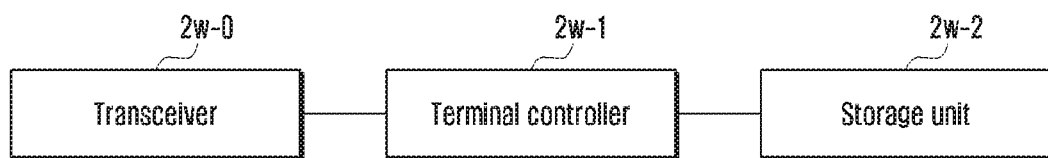
FIG. 2W illustrates the configuration of the terminal according to the embodiment of the present disclosure.

FIG. 2W illustrates the structure of the terminal according to the embodiment of the present embodiment.

Referring to FIG. 2W, the terminal may include a transceiver 2w-0, a terminal controller 2w-1, and a storage unit 2w-2. In the present disclosure, the terminal controller 2w-1 may be defined as a circuit or an application specific integrated circuit or at least one processor.

The transceiver 2w-0 may transmit/receive a signal to/from other network entities. The transceiver 2w-0 may receive, for example, the information on the beam reciprocity (beam correspondence) from the base station and transmit the RACH signal.

The terminal controller 2w-1 may control the overall operation of the terminal according to the embodiment of the present disclosure. For example, the terminal controller 2w-1 may control the signal flow between the respective blocks to perform the operations according to the above-described drawings and flowcharts. Specifically, the terminal controller 2w-1 is operated according to a control signal from the base station and may perform a control to receive the information on the beam reciprocity (beam correspondence) from the base station and transmit the RACH signal to the base station.

The storage unit 2w-2 may store at least one of the information transmitted/received through the transceiver 2w-0 and the information generated through the terminal controller 2w-1.

Figure 2X:
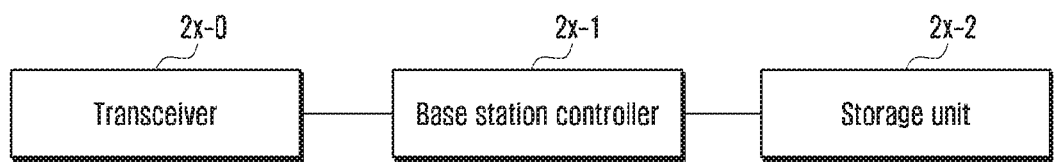
FIG. 2X illustrates the configuration of the base station according to an embodiment of the disclosure.

FIG. 2X illustrates the configuration of the base station according to the embodiment of the present embodiment.

Referring to FIG. 2X, the base station may include a transceiver 2x-0, a base station controller 2x-1, and a storage unit 2x-2. In the present disclosure, the base station controller 2x-1 may be defined as a circuit or an application specific integrated circuit or at least one processor.

The transceiver 2x-0 may transmit/receive a signal to/from other network entities. The transceiver 2x-0 may notify, for example, the terminal of the beam reciprocity (beam correspondence), and may transmit the related parameters together.

The base station controller 2x-1 may control the overall operation of the base station according to the embodiment of the present disclosure. For example, the terminal controller 2x-1 may control the signal flow between the respective blocks to perform the operations according to the above-described drawings and flowcharts. Specifically, the base station controller 2x-1 may perform a control to transmit the information on the beam reciprocity (beam correspondence) to the terminal, transmit the related parameters, and receive the RACH signal from the terminal.

The storage unit 2x-2 may store at least one of the information transmitted/received through the transceiver 2x-0 and the information generated through the terminal controller 2x-1.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a terminal in a wireless communication system, the method comprising:
    receiving, from a base station, a primary synchronization signal (PSS), a secondary synchronization signal (SSS) and a master information block (MIB) based on a first subcarrier spacing, the MIB including information on a second subcarrier spacing;
    receiving, from the base station, a system information block (SIB) based on the second subcarrier spacing, the SIB including information on a third subcarrier spacing and information on a fourth subcarrier spacing;
    transmitting, to the base station, a random access preamble based on the third subcarrier spacing;
    receiving, from the base station, a random access response based on the second subcarrier spacing; and
    transmitting, to the base station, a message requesting a radio resource control (RRC) connection based on the fourth subcarrier spacing.

2. The method of claim 1, wherein the first subcarrier spacing is predefined based on a frequency band on which the PSS and the SSS are received.

3. The method of claim 1, further comprising receiving, from the base station, a message including a contention resolution identity based on the second subcarrier spacing.

4. The method of claim 1, wherein the PSS, the SSS and the MIB are received on a frequency position with an offset from a center frequency.

5. A terminal in a wireless communication system, the terminal comprising:
    a transceiver to be configured to transmit and receive a signal; and
    a processor to be configured to:
        receive, from a base station, a primary synchronization signal (PSS), a secondary synchronization signal (SSS) and a master information block (MIB) based on a first subcarrier spacing, the MIB including information on a second subcarrier spacing;
        receive, from the base station, a system information block (SIB) based on the second subcarrier spacing, the SIB including information on a third subcarrier spacing and a fourth subcarrier spacing;
        transmit, to the base station, a random access preamble based on the third subcarrier spacing;
        receive, from the base station, a random access response based on the second subcarrier spacing; and
        transmit, to the base station, a message requesting a radio resource control (RRC) connection based on the fourth subcarrier spacing.

6. The terminal of claim 5, wherein the first subcarrier spacing is predefined based on a frequency band on which the PSS and the SSS are received.

7. The terminal of claim 5, wherein the processor is further configured to receive, from the base station, a message including a contention resolution identity based on the second subcarrier spacing.

8. The terminal of claim 5, wherein the PSS, the SSS and the MIB are received on a frequency position with an offset from a center frequency.

9. A method of a base station in a wireless communication system, the method comprising:
    transmitting, to a terminal, a primary synchronization signal (PSS), a secondary synchronization signal (SSS) and a master information block (MIB) based on a first subcarrier spacing, the MIB including information on a second subcarrier spacing;
    transmitting, to the terminal, a system information block (SIB) based on the second subcarrier spacing, the SIB including information on a third subcarrier spacing and information on a fourth subcarrier spacing;
    receiving, from the terminal, a random access preamble based on the third subcarrier spacing;
    transmitting, to the terminal, a random access response based on the second subcarrier spacing; and
    receiving, from the terminal, a message requesting a radio resource control (RRC) connection based on the fourth subcarrier spacing.

10. The method of claim 9, wherein the first subcarrier spacing is predefined based on a frequency band on which the PSS and the SSS are received.

11. The method of claim 9, further comprising transmitting, to the terminal, a message including a contention resolution identity based on the second subcarrier spacing.

12. The method of claim 9, wherein the PSS, the SSS and the MIB are received on a frequency position with an offset from a center frequency.

13. A base station in a wireless communication system, the base station comprising:
    a transceiver to be configured to transmit and receive a signal; and
    a processor to be configured to:
        transmit, to a terminal, a primary synchronization signal (PSS), a secondary synchronization signal (SSS) and a master information block (MIB) based on a first subcarrier spacing, the MIB including information on a second subcarrier spacing;
        transmit, to the terminal, a system information block (SIB) based on the second subcarrier spacing, the SIB including information on a third subcarrier spacing and information on a fourth subcarrier spacing;
        receive, from the terminal, a random access preamble based on the third subcarrier spacing;
        transmit, to the terminal, a random access response based on the second subcarrier spacing; and
        receive, from the terminal, a message requesting a radio resource control (RRC) connection based on the fourth subcarrier spacing.

14. The base station of claim 13, wherein the first subcarrier spacing is predefined based on a frequency band on which the PSS and the SSS are received.

15. The base station of claim 13, wherein the processor is further configured to transmit, to the terminal, a message including a contention resolution identity based on the second subcarrier spacing.

16. The base station of claim 13, wherein the PSS, the SSS and the MIB are received on a frequency position with an offset from a center frequency.

* * * * *